(12) United States Patent  (10) Patent No.: US 7,995,989 B2
Wiedeman et al.  (45) Date of Patent: Aug. 9, 2011

(54) METHOD AND APPARATUS PROVIDING SUPPRESSION OF SYSTEM ACCESS BY USE OF CONFIDENCE POLYGONS, VOLUMES AND SURFACES IN A MOBILE SATELLITE SYSTEM

(75) Inventors: Robert A. Wiedeman, Sedalia, CO (US); Paul A. Monte, San Jose, CA (US); Michael J. Sites, Fremont, CA (US)

(73) Assignee: Globalstar, Inc., Milpitas, CA (US)

( * ) Notice: Subject to any disclaimer, the term of this patent is extended or adjusted under 35 U.S.C. 154(b) by 2940 days.

(21) Appl. No.: 09/751,765

(22) Filed: Dec. 29, 2000

(65) Prior Publication Data

US 2002/0123343 A1 Sep. 5, 2002

(51) Int. Cl.
*H04W 36/00* (2009.01)
(52) U.S. Cl. ........ 455/407; 455/408; 455/283; 455/296; 455/427
(58) Field of Classification Search .................. 455/12.1, 455/13.1, 63.1, 67.11, 67.13, 115.1, 283, 455/296, 297, 427, 429, 456.1, 456.2, 456.3, 455/456.4, 456.5, 456.6, 515, 407–408; 342/352, 342/354, 357.01, 357.17
See application file for complete search history.

(56) References Cited

U.S. PATENT DOCUMENTS

| | | | |
|---|---|---|---|
| 4,972,456 A | 11/1990 | Kaczmarek et al. | 379/59 |
| 5,017,926 A | 5/1991 | Ames et al. | 342/353 |
| 5,126,748 A | 6/1992 | Ames et al. | 353/353 |
| 5,303,286 A | 4/1994 | Wiedeman | 379/59 |
| 5,442,805 A * | 8/1995 | Sagers et al. | 455/456.5 |
| 5,548,800 A * | 8/1996 | Olds et al. | 455/12.1 |
| 5,584,046 A * | 12/1996 | Martinez et al. | 455/13.1 |
| 5,655,005 A | 8/1997 | Wiedeman et al. | 370/320 |
| 5,778,304 A * | 7/1998 | Grube et al. | 455/456.4 |
| 5,844,521 A | 12/1998 | Stephens et al. | 342/357 |
| 5,875,180 A | 2/1999 | Wiedeman et al. | 370/320 |
| 5,919,242 A * | 7/1999 | Greatline et al. | 701/50 |
| 5,920,284 A | 7/1999 | Victor | 342/357.01 |
| 5,946,618 A | 8/1999 | Agre et al. | 455/428 |
| 5,974,356 A | 10/1999 | Doyle et al. | 701/209 |
| 6,011,973 A * | 1/2000 | Valentine et al. | 455/456.6 |

(Continued)

OTHER PUBLICATIONS

Rouffet. 'Globalstar: a Transparent System.' 1225 Electrical Communication (1993) 1$^{st}$ Quarter. Romford, Essex, GB. pp. 84-90.

(Continued)

*Primary Examiner* — William Trost
*Assistant Examiner* — Julio Perez
(74) *Attorney, Agent, or Firm* — Kenneth W. Float

(57) ABSTRACT

Disclosed are methods and apparatus to control the actions of a user terminal (UT) located at a remote location, possibly far from a gateway (GW), which has an interface to the Public Switched Telephone Network (PSTN) and/or to the Internet. The methods and apparatus provide for operation of a mobile satellite communication system having at least one gateway (GW), at least one user terminal (UT), and a constellation of satellites. The methods and apparatus allow access to the communication satellites by specifying an exclusion zone having a confidence limit (CL) associated therewith. The methods and apparatus selectively provide service to a UT depending on a determined location of the UT relative to the exclusion zone and on an estimated error (E) of the determined UT location, wherein location of the UT is determined by the UT, and transmitted to the GW, or location of the UT is determined by the GW.

22 Claims, 19 Drawing Sheets

U.S. PATENT DOCUMENTS

| | | | | |
|---|---|---|---|---|
| 6,018,660 | A * | 1/2000 | Alperovich et al. | 455/433 |
| 6,067,442 | A | 5/2000 | Wiedeman et al. | 455/13.1 |
| 6,072,768 | A | 6/2000 | Wiedeman et al. | 370/58 |
| 6,085,096 | A * | 7/2000 | Nakamura | 455/456.6 |
| 6,122,486 | A * | 9/2000 | Tanaka et al. | 455/68 |
| 6,125,260 | A | 9/2000 | Wiedeman et al. | 455/11.1 |
| 6,157,834 | A * | 12/2000 | Helm et al. | 455/436 |
| 6,166,687 | A * | 12/2000 | Ishikawa et al. | 342/357.16 |
| 6,172,644 | B1 * | 1/2001 | Stilp | 342/457 |
| 6,201,973 | B1 * | 3/2001 | Kowaguchi | 455/456.6 |
| 6,230,017 | B1 * | 5/2001 | Andersson et al. | 455/456.6 |
| 6,246,891 | B1 * | 6/2001 | Isberg et al. | 455/574 |
| 6,343,213 | B1 * | 1/2002 | Steer et al. | 455/411 |
| 6,389,289 | B1 * | 5/2002 | Voce et al. | 455/456.5 |
| 6,448,491 | B1 * | 9/2002 | Sato et al. | 174/389 |
| 6,483,460 | B2 * | 11/2002 | Stilp et al. | 342/457 |
| 6,490,455 | B1 * | 12/2002 | Park et al. | 455/456.4 |
| 6,496,703 | B1 * | 12/2002 | da Silva | 455/456.4 |
| 6,580,372 | B1 * | 6/2003 | Harris | 340/686.6 |
| 6,593,524 | B1 * | 7/2003 | Toedtman | 174/363 |
| 6,603,428 | B2 * | 8/2003 | Stilp | 342/457 |
| 6,643,517 | B1 * | 11/2003 | Steer | 455/456.4 |
| 6,657,587 | B1 * | 12/2003 | Mohan | 342/357.1 |
| 6,690,940 | B1 * | 2/2004 | Brown et al. | 455/456.4 |
| 6,718,169 | B1 * | 4/2004 | Martti et al. | 455/424 |
| 6,745,037 | B1 * | 6/2004 | Neumann et al. | 455/456.1 |
| 6,832,093 | B1 * | 12/2004 | Ranta | 455/456.4 |
| 6,898,445 | B2 * | 5/2005 | Slettengren et al. | 455/567 |
| 7,050,907 | B1 * | 5/2006 | Janky et al. | 701/213 |
| 7,194,278 | B1 * | 3/2007 | Cook | 455/461 |
| 2006/0194576 | A1 * | 8/2006 | Karabinis et al. | 455/427 |

OTHER PUBLICATIONS

Coley et al. 'Euteltracs.' Eutelsat. pp. 261-266.

* cited by examiner

FIXED REGION ON EARTH WHERE DURING t1 TO t2 USER TERMINALS MAY COMMUNICATE TO THE GATEWAY 95% OF THE TIME

FIXED REGION ON EARTH WHERE DURING t1 TO t2 USER TERMINALS MAY COMMUNICATE TO THE GATEWAY 100% OF THE TIME VIA SATELLITES #1 AND #2

PATH OF THE COVERAGE OF SATELLITE 2 DURING THE PERIOD t=t1 TO t4

T=T4

METHOD AND APPARATUS PROVIDING SUPPRESSION OF SYSTEM ACCESS BY USE OF CONFIDENCE POLYGONS, VOLUMES AND SURFACES IN A MOBILE SATELLITE SYSTEM

FIELD OF THE INVENTION

The teachings in accordance with this invention pertain to communications systems and other types of systems requiring system access based upon location and, more particularly, these teachings are applicable to satellite-based cellular communications systems.

BACKGROUND OF THE INVENTION

Satellite cellular communications systems function similarly to terrestrial cellular systems in that they require the location of the user to be known in order to authorize access or, in some cases, perform a system registration procedure for the user. Terrestrial cellular systems typically use groups of cells referred to as location areas to determine acceptability of a user (see, for example, The GSM System for Mobile Communications, Mouly and Pautet (1992)). The user, upon turning on the telephone, is sensed by the cell that he is in, and the cell base station reports the user as active to a base station controller (BSC) which is controlling a group of cells that denotes a particular location area. In turn the base station controller notifies a Mobile Switching Center (MSC) that the user is in the location area. The MSC then operates to determine the acceptability of the user to access the system from the current location area. Upon changing location areas, the user automatically reinitiates these reporting activities, thus allowing roaming access between location areas. Typically, the terrestrial cellular system operates in a frequency band that is not shared with other services. As such, the need to protect portions of the service area from user terminal generated interference does not arise.

The process is similar in a satellite communication system except that the location areas are much larger, and in the case of a low earth orbit (LEO) satellite system, are constructed by the gateway to satellite to user terminal co-visibility contours generated by the motion of the satellites, and the location of the gateway on the surface of the earth. In the case of many satellite systems, and unlike terrestrial cellular systems, the frequencies are shared with other radio frequency-using services, such as Radio Astronomy, Microwave Landing Services, Radio Location, and other services operating on the ITU basis of a Primary or Secondary Service. The satellite service may also be a Primary or Secondary Service and thus needs to coordinate with the other Primary service or services, or the satellite service may be a Secondary Service and be required to avoid interference. Most of the time the coordination process and avoidance of interference leads to the specification of a certain protection region within the service area (the service area is also called a location area). Generally, these protection areas are small with respect to the service area itself.

The problem that arises can thus be stated as follows: how will the satellite communication system allow access from the service area, while rejecting users from within a specified distance of or from within an arbitrarily defined protection region within the service area, based upon information received by the Mobile Switching Center from the user terminal or from signals emanating from the user terminal?

Various prior art approaches are known in the fields of position location, the generation of service and location areas by LEO satellite systems, as well as registration and access to cellular systems.

Of particular interest are: "Resolution of Position Location in Low Earth Orbit Systems", a paper presented at IMSI, 1993, "Euteltracs"; U.S. Pat. No. 4,972,456, Kaczmarek et al.; U.S. Pat. No. 5,844,521, Stephens et al.; U.S. Pat. No. 5,920,284, Victor; U.S. Pat. No. 5,974,356, Doyal et al.; U.S. Pat. No. 5,126,748, Ames et al; U.S. Pat. No. 5,017,926, Ames et al; U.S. Pat. No. 5,946,618, Agre et al.; commonly assigned U.S. Pat. No. 6,072,768, Wiedeman, et al.; and commonly assigned U.S. Pat. No. 5,303,286, Wiedeman.

OBJECTS AND ADVANTAGES OF THE INVENTION

It is a first object and advantage of this invention to provide a method and system to protect a site from user terminal RF emissions.

It is a further object and advantage of this invention to provide a method and system to protect a site from user terminal RF emissions by assigning a Confidence Limits to a geometric shape surrounding or associated with a protected site, and to enable a comparison of the Confidence Limit with an expected error in a position location of a user terminal and the user terminals determined position for controlling operation of the user terminal.

It is a further object and advantage of this invention to use Confidence Polygons, Shapes, and Surfaces combined with Confidence Limits to cause the user terminals to operate in a certain mode, or to have a certain action when in or approaching a certain region of the service area.

SUMMARY OF THE INVENTION

The foregoing and other problems are overcome and the foregoing objects and advantages are realized by methods and apparatus in accordance with embodiments of this invention.

These teachings can be employed to control the actions of a user terminal (UT) located at a remote location, possibly far from a gateway (GW), which has an interface to the Public Switched Telephone Network (PSTN) and/or to the Internet or to any other kind of network, either mobile or fixed. These teachings employ a computer generated and stored database of an area (referred to as a Confidence Polygon), a volume (referred to as a Confidence Volume), and/or a plane (referred to as a Confidence Surface) to establish a geometric shape located on the earth, above the earth or in space, or combinations thereof. In addition, there is assigned to these areas, volumes and/or planes a static or a variable value referred to as a Confidence Limit (CL) that can be compared to a value of an error (E) in a position location of the UT. The error signal can either be generated by the UT or by the GW. A controller, preferably a part of the GW, acts upon the database of the geometric shapes, and the assigned or derived values of CL and E, to determine if the comparison of CL and E, combined with the current position of the UT, yields a certain result according to the operational mode of the GW controller. There can be many operational modes of the controller. Depending on the operational mode the result of the comparison of the CL assigned to the area, volume or plane is used to affect control of the UT or an external device attached to the UT. By example, the UT may be forbidden or allowed to access the system or to make or receive a call, or some operational characteristic(s) of the UT may be specified, such as transmitter power, frequency, and the like. The end result, by example, is an ability to provide protection for a site, such as a radio astronomy site, from UT emissions.

Also disclosed is a method for operating a mobile satellite communication system having at least one GW, at least one user terminal UT, and a constellation of satellites. The method includes steps of, for a site to be protected, by example, from UT transmissions, specifying an exclusion or inclusion zone having a confidence limit (CL) associated therewith; and selectively providing service to a UT depending on a determined location of the UT relative to the exclusion or inclusion zone and on an estimated error (E) of the determined UT location. The exclusion or inclusion zone is specified to be at least one of a polygon that defines an area, a volume, or a surface. The location of the UT can be determined by the UT by its own internal calculations, or by using an external source such as GPS, and transmitted to the GW, or the location of the UT can be determined by the UT in cooperation with the GW, or the location of the UT is determined by the GW. The UT is granted service or denied service if the value of E is less than CL, and the GW may set the value of CL to be less than a possible minimum value of E for excluding all UTs from operating within the exclusion zone, or it may set the value of CL to be greater than a possible maximum value of E for enabling all UTs to operate within the exclusion zone. Overlapping exclusion zones may be specified, each having a different value of CL, and exclusion zones may be shared by two or more GWs. Boundaries of the exclusion zone can be fixed and static, or they may be dynamic and capable of movement, with variability being a function of, for example, time, or a location of the UT or the GW, or a location of the site to be protected. The exclusion zone may temporary and established and removed as a function of time, and the values of at least one of CL and E may vary as a function of time. At least one of the location or shape of the exclusion or inclusion zone may vary as a function of a location of the UT, or as a function of a location of the GW. The exclusion or inclusion zone may be combinations of Confidence Polygons, Confidence Volumes or Confidence Surfaces. The value of E may be a function of the accuracy of the UT local oscillator, and information that specifies the accuracy of the UT local oscillator can be stored or determined by the UT and sent to the GW, and/or stored in the GW, and/or stored in a home GW of the UT, and transferred from the home GW to a serving GW when the UT is roaming. In addition the value of E for the user terminal may be supplied over a network from a home (HLR) or other location register.

The operation of this invention can be used as a switch, to cause a certain activity by either the user terminal or the gateway, which is based on the location of the user terminal within a service area.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The following description is made in the context of a LEO satellite communication system, however, it should be kept in mind that the method and apparatus described below are not limited for use in only this one important type of communication system, and can be applied to other types of communications systems as well.

Figure 1:
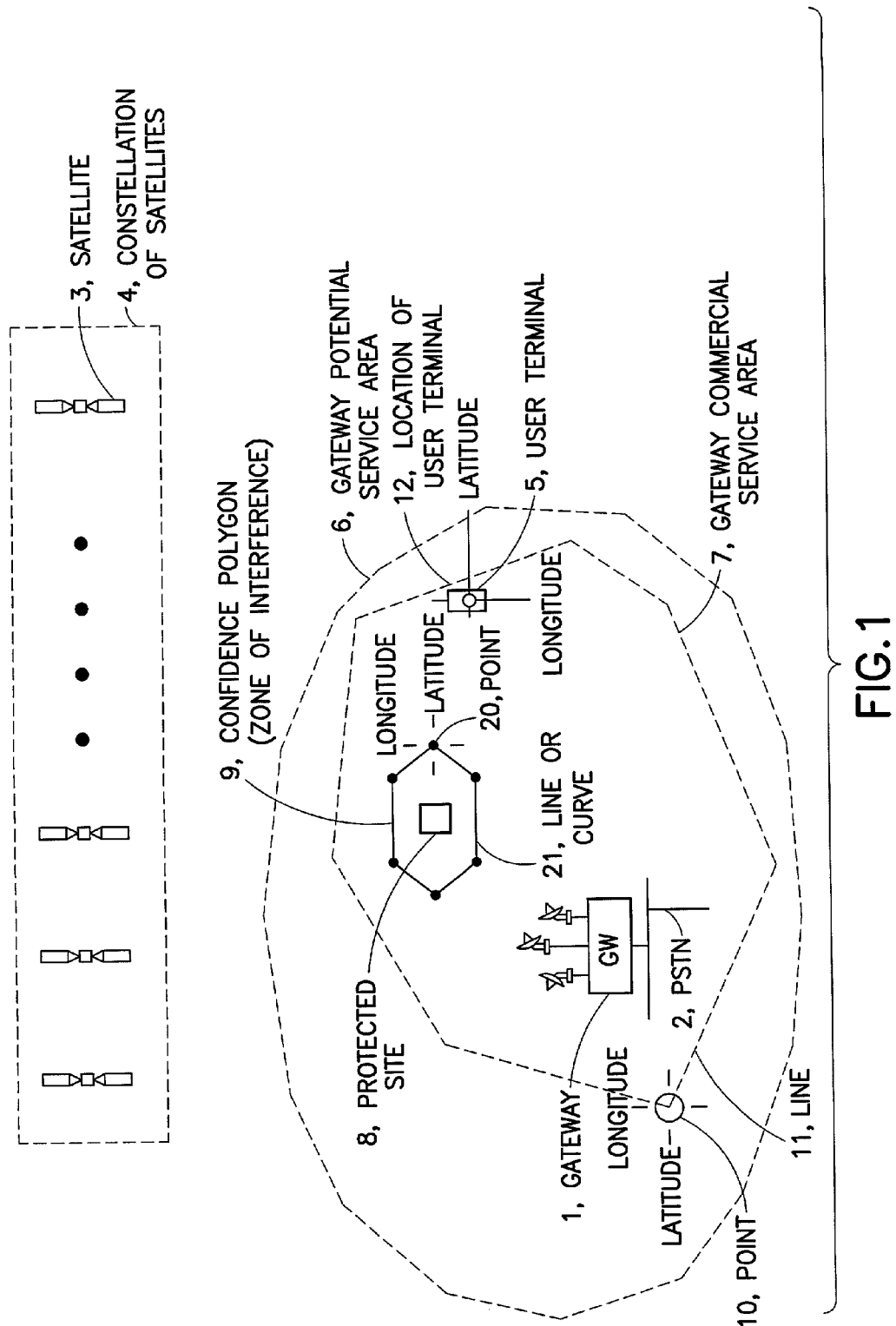
FIGS. 1, 2 and 3 are high level system diagrams useful in explaining the construction of a Confidence polygon, a Confidence volume, and a Confidence surface, respectively, relative to a Protected Site within a Gateway Commercial Service Area.

Reference is made to FIG. 1 for showing a Gateway (GW) 1 which processes calls to and from a user terminal (UT) 5. The calls are routed to and from the Public Switched Telephone Network (PSTN), or the Internet, or any other suitable network 2. From the external or internal network 2 the calls are processed by Gateway 1 via satellite 3. The system may include a constellation of satellites 4. The movement of the satellites over the earth, when combined with the location of Gateway 1, defines a Gateway Potential Service Area 6. The formation of this Gateway Potential Service Area is described in detail below. While the Gateway Commercial Service Area 7 can be the same as the Gateway Potential Service Area 6, it is generally smaller in size, or several Gateway Potential Service Areas 6 are used to cover a large country or group of countries. It is this Gateway Commercial Service area 7 which is defined in some manner as the "service area" or "location area" where the UT 5 is authorized to make and receive calls. There are many suitable ways to define this area, such as a checker board of small squares or other shapes each centered on a specific latitude and longitude, or as a series of connected lines which extend from a collection of nodes each of which is defined by a latitude and longitude, as well as other techniques that may be imagined by those skilled in the art. By whatever technique is used, the resulting area is stored in an electronic memory of the gateway computing system (see FIG. 6, described in further detail below).

The example of FIG. 1 uses a polygon composed of a series of points each defined by a latitude and longitude. Each point is connected to its neighbor by a straight line, although curved lines defined by some specific mathematical equation would be equally acceptable. The collection of points 10 and resulting lines 11 are mathematically defined and stored in the memory of the GW 1. During a registration process and/or a call access process the UT 5 supplies information to the GW 1 that is sufficient to allow the GW 1 to compute the UT's position. Alternatively, the UT 5 may supply its location (by means of known latitude and longitude or other suitable mathematical solution) to the GW 1. The UT 5 may use the Global Positioning Satellite (GPS) system or some other terrestrial means of location determination. In any case the GW 1 finds or computes the location 12 of the UT 5. The GW 1 then compares the UT 5 latitude and longitude position to the ensemble of locations composing its GW Commercial Service Area 7. In the example case, the UT location would be compared to the GW Commercial Area 7 polygon of authorized area. If the UT 5 is found within the area the UT 5 is either registered in the system, or is authorized to make or receive a call. Alternatively, the zone may be used as an exclusion zone and the UT 5 may be excluded from registering in the system or not authorized to make or receive a call.

If there is a location of an interference site or a protection zone, also called a Protected Site 8, within the GW 1 Commercial Service Area 7 which could be interfered with, the UT 5 should not be allowed to transmit when within a Zone of Interference, or when close to the Zone of Interference within a certain tolerance of distance. The Zone of Interference may also be coincident with, in accordance with these teachings, a Confidence Polygon 9 that is bounded by points 20 and lines or curves 21. The potential for Interference to a typical protected site 8 is described in greater detail below. Alternatively, it is not necessary that the zone be one of interference, it could be a zone of non-operation of any kind. Take for example, a group of countries which comprise an economic zone of enterprise which may be collectively a Commercial Service Area. Located within this group of countries may be one which does not allow satellite cellular telephony to be practiced. This zone could be designated with a Confidence Polygon. In a further application of this invention, the zone could be one of allowance of a certain operating mode of the user terminal 5, but exclusion of another operating mode. The practice of this invention could thus be one of selecting the proper operating mode of the transceiver.

As an example, assume that the Protected Site 8 is a Radio Astronomy site. Radio Astronomy is a particular science which, using very weak signals from space, studies the emissions of various radio frequency emitting stars and other celestial objects. In particular, in the band of frequencies from 1610 to 1613 MHz radio astronomers seek signals from stars that are radiating due to excitation of the Hydroxyl molecule. These excitations are further modified by blue and red shifts caused by Doppler due to the movement of the star being examined relative to the Earth. However, the band of frequencies from 1610 to 1626.5 MHz has also been assigned to the Mobile Satellite Service (MSS) for satellite cellular communications. Since the two services (Radio Astronomy and MSS) must co-exist, a means of coordination is required to prevent the Radio Astronomers from receiving signals from the emissions of the UT 5. Coordination controllers, using maximum and minimum carrier to interference (C/I) ratios can be used in link budgets to define a range distance from the Radio Astronomy site 8 that UTs 5 may operate without causing interference. The range developed is composed of many factors, including blocking by buildings or natural terrain features.

This coordination zone is established in this invention as the Confidence Polygon 9 to have an assigned confidence limit. When a UT 5 is found to be within this zone and the UT 5 error in position is not sufficient to satisfy this confidence limit the UT 5 is rejected by the GW 1 or given instructions on how to proceed. The UT 5 may not be allowed to register or to make or receive calls.

Figure 2:
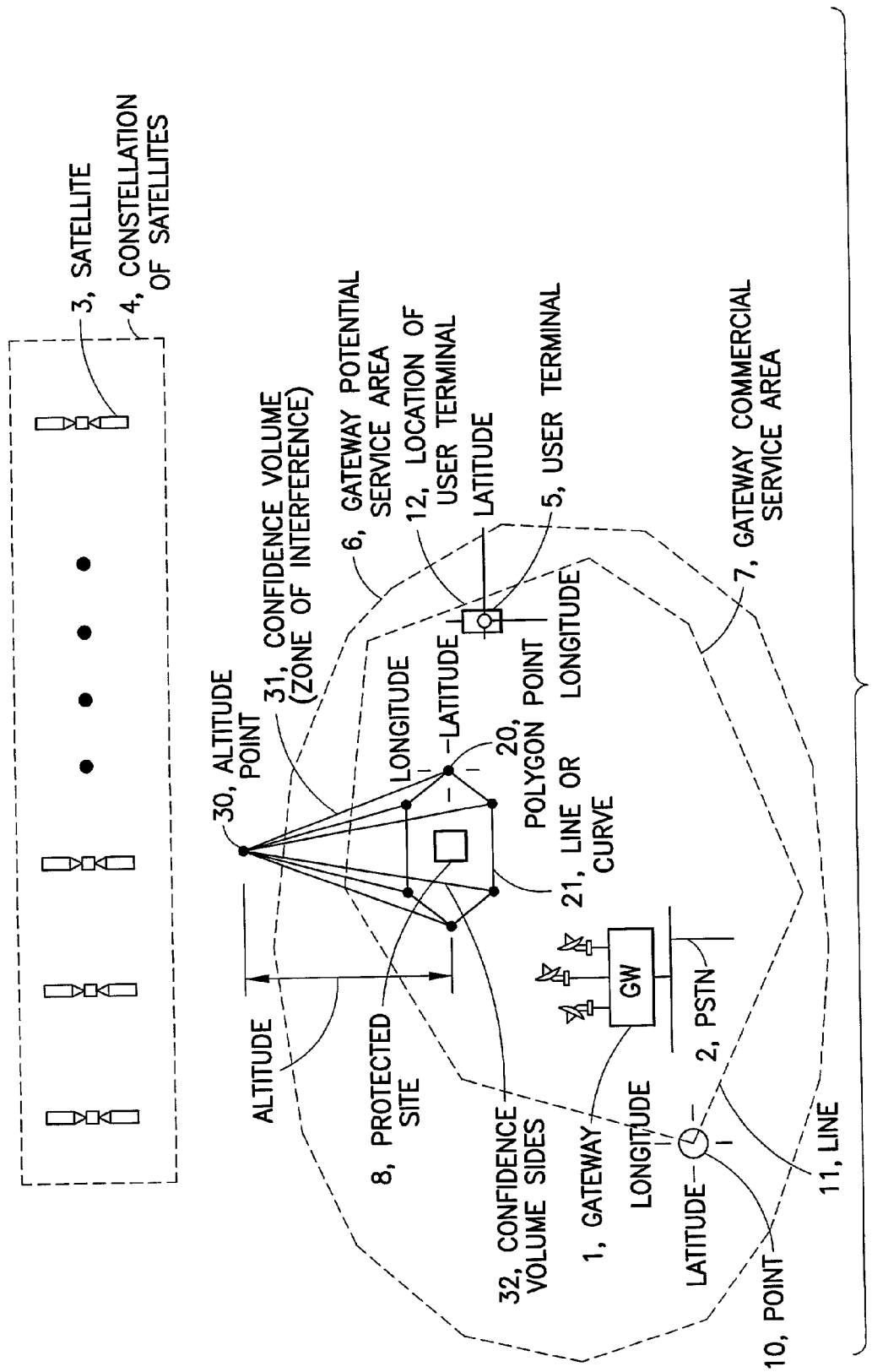

The zone on the earth's surface referred to as the Confidence Polygon 9 may be regular (such as a circle) or more commonly a complex shape. The Confidence Polygon need not be defined to be on the Earth's surface. The zone can be defined in many ways, including the checkerboard and polygon methods discussed for the GW Commercial Service Area 7. By example, the Confidence Polygon 9 is composed of a series of Polygon Points 20 defined by latitude and longitude, with each point connected to its neighbor by a straight line 21. While a straight line is preferred, a curved line defined by a mathematical equation is acceptable as well. The resulting Confidence Polygon 9 is also stored in the electronic memory of the GW 1. Alternatively, the Confidence Polygon 9 definition may be extended to a Confidence Volume 31, as shown in FIG. 2. To construct a Confidence Volume 31 it is only necessary to add one or more Altitude Points 31 located above or below the collection of Point(s) 20. Connecting lines or curves from each Point 20 on the surface of the earth or located above the earth at some altitude, to the Volume Point 30 will create a Confidence Volume 31. The Confidence Volume 31 may be a regular shape such as a cone, cylinder, or cube or alternatively may be any irregular shape. The example in FIG. 2 is one of a cone with the base of the cone conforming to the Confidence Polygon 9, with a single Altitude Point 30 forming the apex of the cone. The lines 21 connecting the polygon points 20 to the apex Altitude Point 30 thus form Confidence Volume Sides 32. Obviously, an inverted cone can be formed by constructing a single Point 20 either on the surface of the earth or at some altitude above it, and then constructing multiple Altitude Points 31 above the single Point 20 and connecting lines or curves as before to construct the sides of the inverted cone Confidence Volume 31. Many other shapes and volumes are possible, such as spheres, hemispheres, and any mathematically defined shape or volume.

Figure 3:
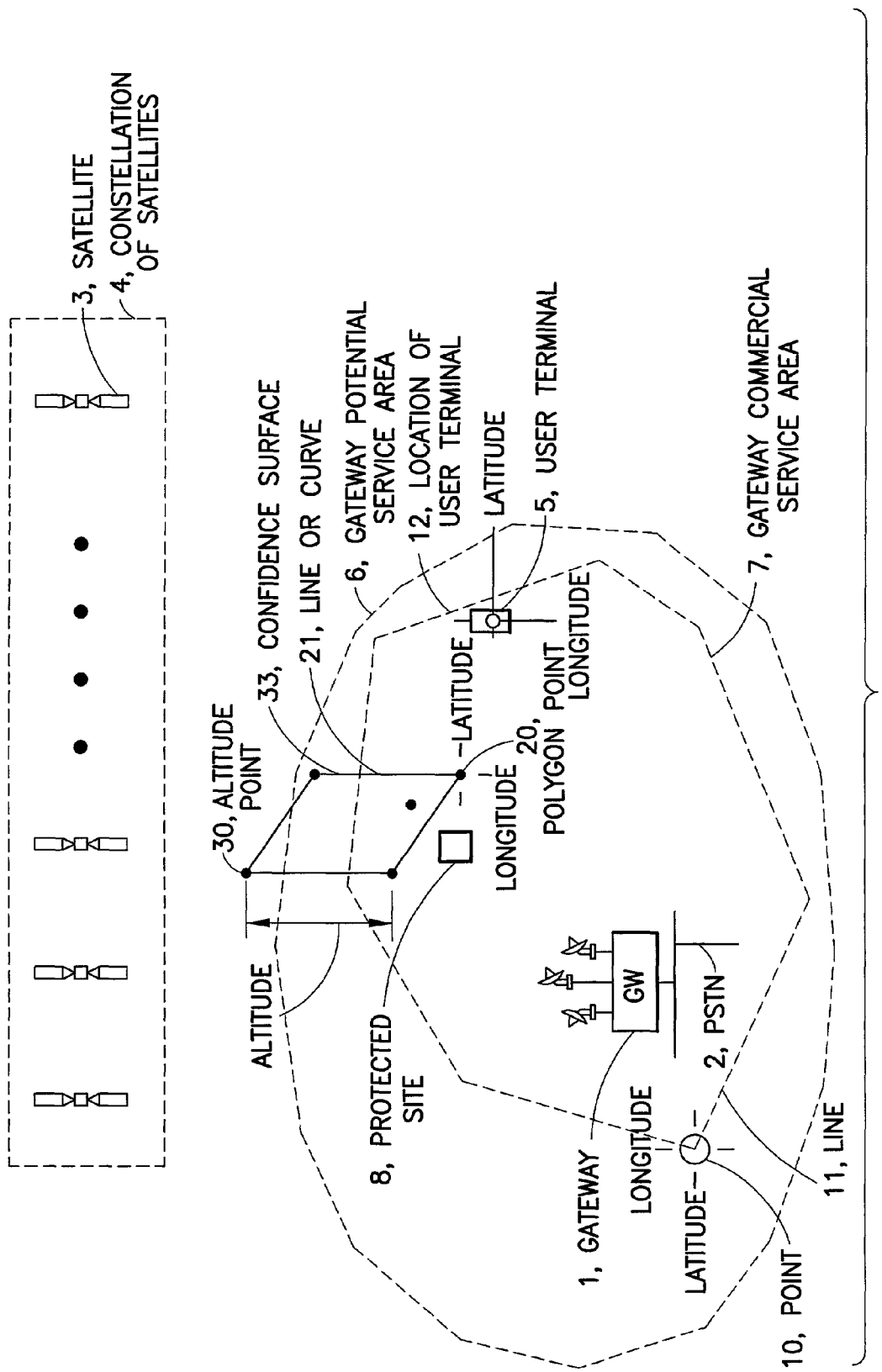

It is also possible to construct a Confidence Surface 33 as shown in FIG. 3 by combining Polygon Points 20 with Altitude Points 30. A Surface such as this can be used to divide the GW Commercial Service Area 7 into two or more segments by making the Polygon Points 20 coincide with the GW Commercial Service Area Points 10.

As before, in the registration or call authorizing phase of the UT/GW processing the location of the UT 5 is checked against the electronic maps. If the UT 5 is within the GW Commercial Service Area 7, and not within the Confidence Polygon 9 or the Confidence Volume 30, the UT 5 is allowed to attempt registration or to make or receive a call. However, this process can result in a problem occurring. More particularly, since the location of the UT 5 is subject to error, it may be possible for the UT 5 to gain access to the system when actually within the Confidence Polygon 9 or Volume 31.

In order to ensure that the UT 5 is not located beyond a certain limit of the GW Commercial Service Area 7 or within a certain limit of a Confidence Polygon 9, a polygon of any shape, again composed of a series of points 20 connected with lines (or curves) 21 is constructed. Each point is defined by a latitude and longitude value. These polygons may coincide with the GW 1 Commercial Service Area 7, or they may be larger, or generally, smaller. The polygon is assigned a Confidence Level (CL) based on knowledge of the UT 5 position on the earth in terms of latitude or longitude, and/or on a level of error (E) that the position location system calculation can have and still accept or reject the UT 5. These levels of error may be expressed as a value certain, or they may be expressed as a mathematical equation, and may depend on other factors or results of computation (such as the center frequency of emission). This is to say, in order for a UT 5 to gain access or be registered in the system the UT 5 must be within the GW Commercial Service Area polygon within the specified CL. Determination of CL is accomplished by the GW 1, where the CL may be a static unchanging value, or it may be a value that is variable over time and which adjusts CL according to parameter changes, such as the average Geometric Dilution of Precision (GDOP) over either the GW Commercial Service Area 7, or over the Confidence Polygon 9 or Volume 31. Other parameter changes can be used to adjust the value of CL as well, such as the ephemeris of the satellites 3 or the error in knowing the ephemeris, the timing values in the circuits sending the signals used for determining range, or the errors in determining range rate.

There are several suitable ways to establish a CL boundary or zone. A first technique uses a fixed level of error depending on the underlying mechanism of obtaining the measured values used in the calculation. For example, if a GPS value of latitude and longitude is to be obtained from the UT 5, a fixed value of plus or minus 100 meters may be assigned as the possible error. A second technique employs a variable level of error depending on an expected value plus or minus a variation which depends on statistical evidence built up over a period of time. A third technique employs a variable level of error depending on an expected value plus or minus a variable that depends on engineering estimates as to the quality of the measurements at a particular time. A fourth technique employs a variable level of error that depends on the difference between a measured value and an expected value. A fifth technique employs a variable level of error that depends on a measured value and a different measured value relative to another device having a known error (commonly referred to as differential error determination). These five techniques for determining the Confidence Level (CL) are exemplary, and other methods can be used as well.

Determination of an error value "E" for the position of the UT 5 can be accomplished either by the UT 5 or by the GW 1, or by both in combination, or the value of "E" may be determined by an external source. In any case, the UT 5 makes measurements of some kind. These measurements may be made using a system external to the low earth orbit satellite communications system or they may utilize system internal measured values created by the satellite communications system itself. A description of one technique for utilizing system internal measured values is discussed in greater detail below, which is a presently preferred means of determining values measured by the UT 5 and transmitted to the GW 1. In the example discussed below the following measurements and parameters are employed: the identifier of the reference satellite; the identifier of the measured satellite; the signed time difference between that of the measured satellite and the reference satellite in a CDMA system, the start time of the outer PN cycle of the reference satellite and the next start of the outer PN cycle of the measured satellite within $\frac{1}{8}^{th}$ of a chip); the carrier frequency offset between the nominal carrier of the reference satellite and the measured satellite; and the system time of the measurement derived from the reference satellite (to within 1.25 ms.)

Errors in measurement of the signed time difference between the measured satellite and the reference satellite occur because of errors in the transmission of the Pilot channel signal from the GW 1 and errors due to the knowledge of the ephemeris of the satellites used by the GW 1 for timing. Errors in measurement of the frequency offset (Doppler) measured by the UT 5 depend on the determination of the "nominal" carrier frequency of the reference satellite and the "nominal" carrier frequency of the measured satellite. These both depend entirely on the accuracy of the internal local oscillator of the UT 5. Finally, the system time transmitted by the reference satellite will have errors depending on the accuracy of the clock and timing devices of the GW 1. In any case, the UT 5 can estimate or calculate the error based on fixed or variable values of error expected in the above mentioned measurements. The error determination discussed above is by way of example one of a particular system, and it is possible to determine the errors by other means. The UT 5, in addition to sending the measured data, sends the estimated error in the measurements that it has determined. Alternatively, the UT 5 can transmit the values determined by measurement to the GW 1, and the GW 1 then uses its own means to determine error values which are assigned to the measured values received from the UT 5. In this case, and by example, the GW 1 knows the ephemeris of the satellite, and the error associated with the Pilot channel transmission to the reference and the measured satellite, and it may thus assign an error value to the range measurement. Likewise, the system time error is known by the GW 1, and it can be applied to the calculation of the error by the GW 1.

However, the value for the error in the UT 5 Doppler determining factor used in the determination of the carrier offset of the measured satellite with respect to the reference satellite presents more of a problem. In order to estimate an error value for this component the GW 1 requires calibration information regarding the accuracy of the local oscillator of the UT 5. There are several suitable methods for determining the accuracy of the UT local oscillator. In accordance with a first technique the UT manufacturer measures under various thermal conditions an average accuracy, and this value is used as a fixed input at the GW 1 for determining the error in the UT 5 local oscillator frequency. In another implementation, the GW 1 employs a table of various values composed of temperature vs. local oscillator frequency accuracy which can be looked up, according to a variable average temperature estimate by the GW for the time of day and season of the year. In a third technique the UT 5 sends a temperature measurement indicative of the temperature of the local oscillator at the time the measurements were taken. The GW 1 then uses the received temperature to lookup in the table the accuracy, which is an average of many manufacturing measurements made by the UT manufacturer. In a fourth technique the UT 5 sends the data as in the third technique, and the GW 1 looks up the actual variation of the local oscillator measured by the manufacturer of the UT 5, and stored in the GW memory for that specific UT. A roaming UT 5 would have this information sent to the serving GW 1 by its home GW 1. It is also within the scope of these teachings for the UT 5 to calculate the error based on any of the above methods and send the resulting error over the air interface to the GW 1. These error determining means are but a few of the potential ways to determine the error.

In any case, either the UT 5 or the GW 1 calculates an error value for the resulting latitude and longitude of the position of the UT 5. In like manner to the previous error assignments discussed, the error values may be fixed or variable depending on the parameters.

Knowing the confidence level ("CL") required by the Confidence polygon 9 or volume 31 or surface 33, a next step compares the assigned value of UT 5 error E to "CL" and determines if the UT 5 is acceptable to be registered or to make or receive a call. The confidence setting permits various operational methods for accepting or rejecting registrations and requests for making or receiving calls.

The description of the use of Confidence Polygons 9, Confidence Volumes 31 and Confidence Surfaces 33 has been described in terms of acceptance and rejection of a UT 5 by a GW 1 when the UT 5 has been found to be located within a Confidence Polygon or Confidence Volume. However, this is not the only use for this aspect of the invention. It is possible to employ many different operations by the use of this invention, such as turning on or off a subsystem or device, changing the parameters of a computer program, changing the state of a device or software implementation, causing a radio frequency device to change frequencies or reduce/increase power, and so forth.

There are several operational methods for using the comparison of the "CL" assigned value for the Confidence Polygon 9, Confidence Volume 31 and Confidence Surface 33, and the calculated or estimated error E in the position of the UT 5. The examples discussed below are only a few of the applications that can be implemented in accordance with the teachings of this invention. In the following description, if a reference is made only to a Confidence Polygon 9, it is assumed that the reference can also be to the Confidence Volume 31 or to the Confidence Surface 33.

A first application prevents all UTs 5 from operating within a Confidence Polygon 9. In this case the prevention of all UTs 5 from operating in a Confidence Polygon 9 may be accomplished by setting the confidence level "CL" for the Confidence Polygon 9 to zero. Since no UT 5 position location function can satisfy this level of error, all UTs 5 are excluded from the Confidence Polygon 9.

A second application operates to include all UTs 5 for operation within a Confidence Polygon 9 by setting the confidence level CL for the Confidence Polygon 9 to 100%. Since all UTs 5 can satisfy this level of error, all UTs 5 are accepted.

A third application operates to issue a warning to a UT 5 that it is approaching a Zone of Interference or a Zone of Non-Operation. To accomplish this the GW 1 establishes two Confidence Polygons 9 or Volumes 31, with one located inside the other. The inner Confidence Polygon 9 has its confidence level CL set to zero, and the CL of the outer Confidence Polygon has its CL set to a value greater than zero, but not high enough that all UT 5 errors E could satisfy the level of CL chosen. When a UT 5 is located within the outer Confidence Polygon or Volume but not within the inner Confidence Polygon or Volume, and its error E is found to be less than CL, the UT 5 can be registered or authorized to make or receive calls. In addition, the GW 1 can send a message to be displayed by characters or an icon on a UT 5 display interface, alternatively the GW message can be interpreted by the UT 5 and a light or other indicator can warn the user of the UT 5 that he or she is near a Zone of Interference or a Zone of Non-Operation. Note that the two Confidence Polygons 9 or Volumes 31 can be concentric, or they may be of irregular shapes with respect to each other.

A further application provides for discriminatory UT 5 operation. In this case it is possible, using the Confidence Polygon 9 as discussed above, to discriminate UT 5 one from another, allowing registration and authorizing making and receiving calls from one UT 5 while rejecting others within a certain region. To accomplish this, a Confidence Polygon 9 or Volume 31 or Surface 33 is constructed with a certain CL. The GW 1 then processes information from the desired UT 5 and, so long as the error E of the UT 5 is within the value of CL, the UT 5 access is accepted. The GW 1 also processes information from the undesired UT 5. The GW 1 has information, such as from another subsystem (such as the billing subsystem) or an external network or device, that tells the GW 1 that the UT 5 should be denied access from the particular Confidence Polygon 9 or Volume 31 that the UT 5 is found to be located in. The GW 1 assigns a value to the error E such that E is greater than the CL of the Confidence Polygon 9 or Volume 31, which results in the UT 5 being rejected when in that particular region or zone. Once the UT 5 moves out of the zone the UT 5 functions as it did before, and may be provided system access.

It is also within the scope of these teachings to provide overlapping Confidence Polygon 9 or Confidence Volume 31 operation. Further in this regard, the discriminatory UT operation mode described above can be expanded to include overlapping Confidence Polygons 9 or Volumes 31. In this mode of operation, two or more Confidence Polygons 9 or Volumes 31 are constructed and assigned different CL values. In the larger valued CL polygon or volume all UTs 5 of one type (e.g., those having lesser accuracy) can operate, while in the smaller valued CL polygon or volume only a second UT 5 type (having greater accuracy) can operate. However, in the overlapped region between the first and second Confidence Polygons 9 or Confidence Volumes 31 both UT 5 types are permitted to operate. This is accomplished by the GW 1 inspecting the error value E of the second UT 5 type. If the error value E of a particular UT 51 is below a threshold, it is denied access while in the non-overlapped area of the larger-valued CL polygon or volume, while its lower E value would be acceptable while in the overlapped area or in the non-overlapped area of the lesser-valued CL polygon or volume. Likewise, a first type of UT 5 is accepted in the greater CL polygon or volume and the overlapped area, but its larger error value (E) is rejected in the non-overlapped area of the lesser valued CL polygon or volume.

It is also within the scope of these teachings to provide a moving Confidence Polygon 9 or Confidence Volume 31 operation. Further in this regard, it can be noted that there is no reason that the Confidence Polygon 9 or Confidence Volume 31 need be static, unmoving or unchanging. As an example, consider a vehicle with sensitive instruments or communications devices which desires immunity from interference over a local zone surrounding itself. In this case the GW 1 can be instructed to construct a Confidence Polygon 9 or a Confidence Volume 31 centered upon the vehicle, with the vehicle's position being known by previous calculations or from external sources of information. The movement of the vehicle can either be pre-programmed, updated periodically by polling the vehicle location, or it can be predicted by map matching techniques. In any case the Confidence Polygon 9 or Confidence Volume 31 moves with respect to the GW Commercial Service Area 7. Any of the foregoing applications can be used to either accept or reject a UT 5 when the UT 5 is in proximity to the vehicle. Of course, there may be many moving Confidence Polygons 9 or Volumes 31 within the GW Commercial Service Area 7. Likewise, the vehicle may specify a Confidence Polygon 9 or Volume 3 which allows only those UTs 5 within some distance of itself to be accepted for access, while denying access to those located further away. Furthermore, it is not a requirement that the GW 1 must be the arbitrator of the values of the Confidence Polygon 9 or Volume 31. The UT 5 (such as one located on the vehicle) itself can function as the controller of the Confidence Polygon 9 or Volume 31, sending instructions to the GW.

Further with regard to embodiments of these teachings, and has been made apparent, there is no reason that the zone be defined as the planar Confidence Polygon 9. The Confidence Volume 31 is equally as advantageous in certain circumstances. For example, consider a cone centered on a protected Radio Astronomy site, where the cone is constructed to provide radio frequency protection when an aircraft is transmitting a signal in the vicinity of the site. Link budgets can be used to establish a height above the site which is acceptable, and distances around the site if a ground-based UT 5 is transmitting. A cone having a certain height an ground area can thus be constructed which provides protection from both airborne and ground-based RF emitters.

Turning now to the Confidence Surface 33 of FIG. 3, one may be defined by combining Polygon Points 20 with Altitude Points 30. As an example, it is possible to construct a Confidence Surface 33 having two Polygon Points 20 that coincide with two Points 10 of the GW Commercial Service Area 7. Two Altitude Points 30 defined at suitable locations bisect the GW Commercial Service Area into two segments. A UT 5, when transiting between these segments, encounters the CL of the Confidence Surface 33 and, having its respective error E value compared to CL, cause the GW 1 or the UT 5 to perform a calculation or operation, and then either the GW 1 can instruct the UT 5 or the UT 5 can instruct the GW 1 to perform a certain operation (such as changing transmit frequencies). Constructing a single Polygon Point 20 in a location within the GW Commercial Service Area 7, and constructing a single Altitude Point 30 above that point, and thence constructing multiple Confidence Surfaces 33 with the single Polygon Point 20 and the single Altitude Point 30 as their apex constructs multiple segments of the GW Commercial Service Area 7.

Further with regard to the teaching of this invention, the MSS system may employ temporary Confidence Polygons 9, Confidence Volumes 31, and Confidence Surfaces 33. That is, it is not necessary for the Confidence Polygons 9, Volumes 31, and Surfaces 33 to remain fixed and static in time. Instead, they can be constructed in the memory of the GW 1 computing system, or some other system, such that they exist or become active only for predetermined times, and then become inactive. For example, the exemplary Radio Astronomy protection site 8 may operate only periodically, with measurements taken for several hours once every few weeks. A schedule of operational times can be communicated by various means to the GW 1 which then operates to invoke the Confidence Polygon 9, Confidence Volume 31 or Confidence Surface 33 for the period of Radio Astronomy measurements, and to deactivate the emission protection after this period of time.

Relatedly, there may be time varying Confidence Polygons 9, Confidence Volumes 31, and Confidence Surfaces 33. That is, it is not necessary that the Confidence Polygon 9, Volume 31 or Surface 33 remain static during their use. Instead, they can be defined such that one or more points from which they are constructed change with time. For example, one or more points may move with time in conformance with real-time input from an operator, or in accordance with a predetermined motion over time caused by a computer routine invoked by the GW 1, or in accordance with received information such as signal strength or other parameters of a link budget or other external stimuli. Alternatively, they can be defined such that one or more points are eliminated, thereby changing the shape of the Confidence Polygon 9, Volume 31 or Surface 33 in accordance with either real-time input from an operator, or in accordance with a predetermined motion over time caused by a computer routine invoked by the GW 3, or in accordance with received information such as signal strength or other parameters of a link budget or other external stimuli. As but one example, one or more Altitude Points 30 may change in elevation over time, thereby varying the shape of the corresponding Confidence Volume 31 or Confidence Surface 33.

The teachings of this invention also provide for time varying CL and E values such that, for example, the value of CL is defined such that for a period of time it is of one value, and then changes to another value for another period of time. For example, the value of CL in the Radio Astronomy example may be set to low values for periods of very sensitive measurements, and then set to a higher value for times when the Radio Astronomers are making less sensitive measurements. The value of CL can be constructed in the memory of the GW 1 computing system, or some other system, such that it assumes a predetermined value for predetermined times, and then assumes another predetermined value for another period of time. The value of CL can be varied according to a mathematical formula which can be controlled by the operator of the GW 1, or controlled by a computer program invoked by the GW 1 according to a predetermined schedule, or varied by a computer program in accordance with received information either from the UT 5, a subsystem of the GW 3, or from some external source.

Likewise, the value of E, or the error of the position of the UT 5, need not remain static, or remain as reported by the UT 5, or calculated by the GW 1. There will always be a certain "E" which is determinable by the UT 5 or the GW 1. This value may be used as discussed previously, alternatively the E value may be modified by the UT 5 or by the GW 1 or by an external system, as necessary, to produce a certain action either by the GW 1 or the UT 5. As in the case of the time varying CL value, the value of E may be time varying as well. In addition to switching the E value on or off, different values of E can be assigned either in real-time by an operator, or according to a computer program, or the value of E can be varied according to a mathematical formula which can be controlled by the GW 1 operator, by a computer program invoked by the GW 1 according to a predetermined schedule, or varied by a computer program in accordance with received information either from the UT 5, a subsystem of the GW 1, or by an external source.

Further in accordance with these teachings the position of the UT 5 can be used for varying the Confidence Polygon 9, Confidence Volume 31, or the Confidence Surface 33. In this case the position of the UT 5 itself is used to vary the parameters either in construction points, connecting lines or curves, or volume sides. In addition, the value of CL or E can be made variable as a function of the location of the UT 5. For example, the value of CL that is to be met by a particular UT 5 at any point along a path (either predetermined or randomly selected) may be varied according to a predetermined set of parameters, either by an operator, a computer program, or in accordance with sensory information received by the GW 1. Thus, the value of CL to be met by the UT 5 becomes either greater or smaller as the distance between the UT 5 and the protected site 8 becomes larger or smaller.

This invention also enables the creation of Confidence Polygons 9, Confidence Volumes 31, or Confidence Surfaces 33 when a UT 5 is in another Confidence Polygon 9, Volume 31 or Surface 33 definition. In this case it may be of interest to create a Confidence Polygon 9, Volume 31 or Surface 33 when the UT 5 enters or leaves another Confidence Polygon 9, Volume 31 or Surface 33. By example, a given UT 5 is found to satisfy a certain CL with its E value. In response, the GW 1 then may, according to a predetermined computer routine, construct another Confidence Polygon 9, Volume 31 or Surface 33 to further provide control of the GW Commercial Service Area 7. This may be used to allow greater freedom in assignment as long as there are no UTs 5 within a certain Polygon 9 or Volume 31, and then restrict access when a UT 5 is within that zone. This operation can be combined with that of the temporary and/or time varying operations discussed previously to create a flexible operating scenario. The creation of Confidence Polygons 9, Volumes 31, or Surfaces 33 may be according to a predetermined plan, by a real time operator input, or in accordance with a computer program with static or varying parameters.

Thus far the location of the GW I has been assumed to be fixed. However, in some embodiments the GW 1 may be capable of movement, e.g., it may be vehicle-mounted. In this case the Confidence Polygon 9, Volume 31 or Surface 33 may be static with respect to a particular location on the earth, as described above, or they may move with the GW 1. In the case of a moving GW 1 and moving Confidence Polygon 9, Volume 31, or Surface 33, the geometric definition of the location of the Polygon Points 20 and Altitude Points 30 are defined in coordinates with respect to their vector location relative to the GW 1, and not according to a particular latitude and longitude. The values used may be latitudes and longitudes, but time varying according to the movement of the GW 1.

Likewise, the Confidence Polygon 9, Volume 31 and Surface 33 may move with the UT 5. In this case the geometric definition of the location of the Polygon Points 20 and Altitude Points 30 are defined in terms of coordinates with respect to their vector location relative to the UT 5, and not according to a particular latitude and longitude. The values used may be latitudes and longitudes, but time varying according to the movement of the UT 5.

Since the GW 1 may be moving, the GW Potential Service Area 6 may vary according to the location of the GW 1. Therefore, the GW Commercial Service Area 7 may change with respect to time or some other parameter(s). Since these areas are varying the Protected Site 8 (either moving or static) is redefined in terms of the vector distance and direction from the GW 1, thus affecting the values of the Confidence Polygon 9, Volume 31 or Surfaces 33. This relationship may be predetermined, operator controlled, or may be determined by a computer program with static or varying parameters.

These teachings also apply to moving Protected Sites 8 and Confidence Polygons 9, Volumes 31 and Surfaces 33. In this case the Protected Site 8 may be moving, and a particular Confidence Polygon 9, Volume 31 or Surface 33 may be moving with it. In this case, the geometric definition of the location of one or more Confidence Polygons 9, Volumes 31, or Surfaces 33 are defined in terms of coordinates with respect to their vector location relative to the Protected Site 8. All or a particular Confidence Polygon 9, Volume 31, or Surface 33 may be moving with respect to the Protected Site 8, either in a predetermined manner, or as directed in real time by an operator, or according to a computer program which has either static or varying parameters. The Protected Site 8 may be moving along a predetermined path, a path directed by an operator, or according to a computer program which has either static or varying parameters.

It is further within the scope of these teachings to provide a Confidence Polygon 9, Volume 31, or Surface 33, or values of CL and/or E, that vary according to the position of the satellite(s) 3. A specific case of the operations, described above, is the creation or changing of the Confidence Polygon 9, Volume 31, or Surface 33, and/or the values of CL and/or E, which use the parameters of the ephemeris of a satellite 3, or the constellation of satellites 4, to determine values of the parameters which define the Confidence Polygon 9, Volume 31, or Surface 33. This is especially advantageous in the case of multiple directed radio frequency beams from the satellites 3. In particular, a restriction of the value of CL may be effected for satellite positions where a directed beam could cause interference with a Protected Site if a UT 5 was allowed to register or be authorized to make or receive a call. Likewise, a change in the operating parameters of the satellite 3 or constellation of satellites 4 can effect a change in the values of the parameters which define the Confidence Polygon 9, Volume 31, or Surface 33 and/or the values of CL and/or E associated with each UT 5.

Figure 4:
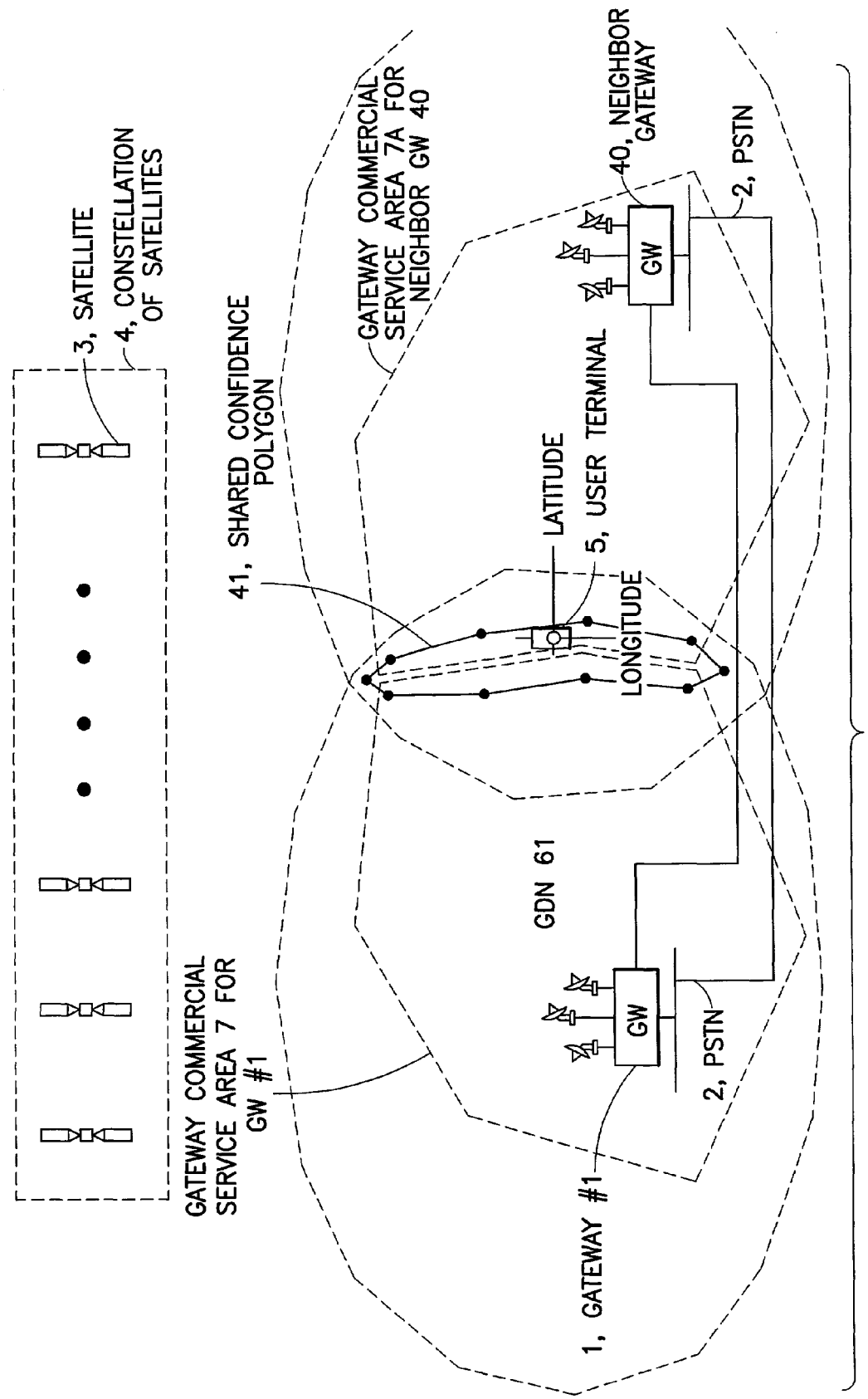
FIG. 4 shows a Confidence polygon shared by two adjacent Gateways.
Figure 5:
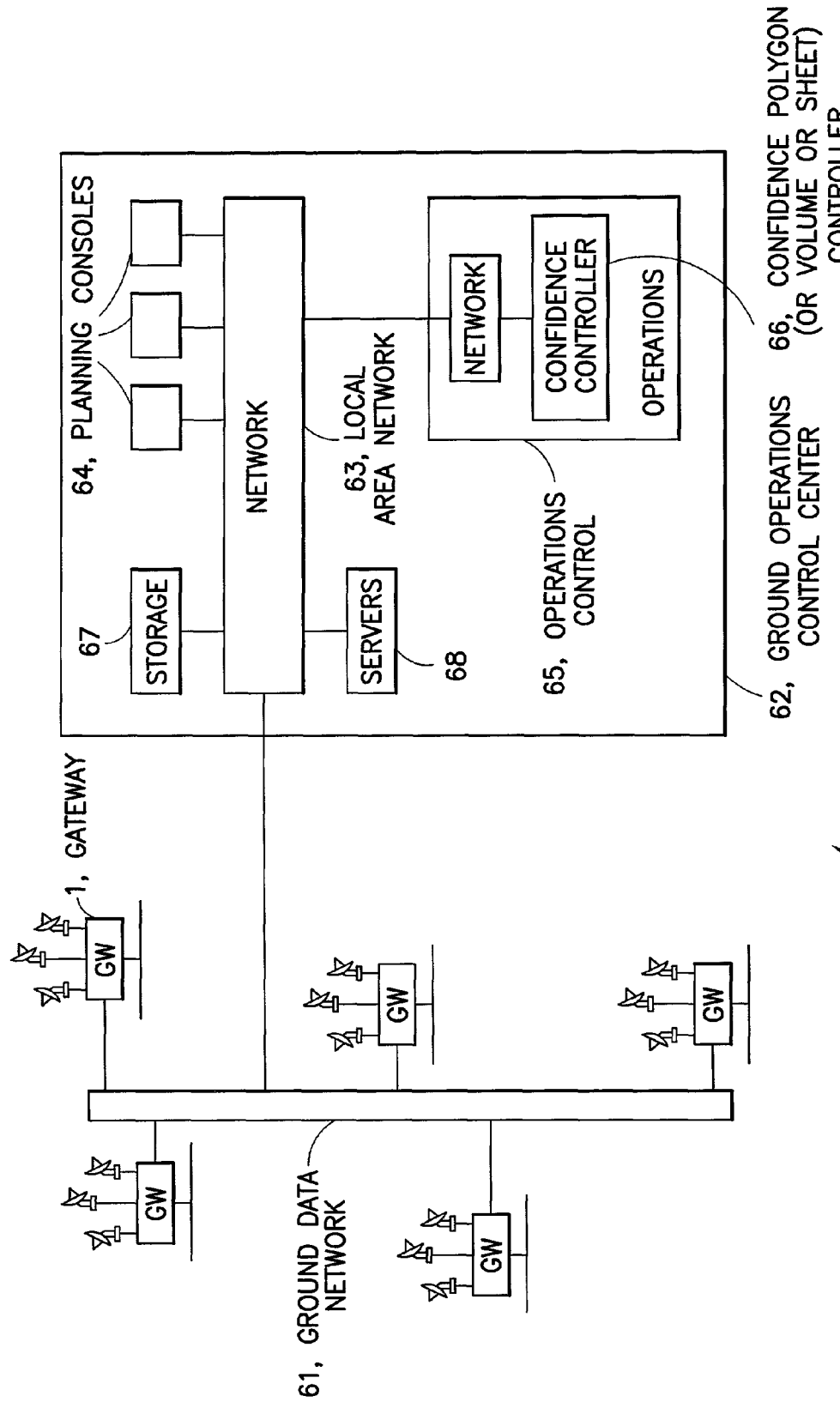
FIG. 5 is a block diagram showing a plurality of Gateways interconnected by a Ground Data Network, that also connects the Gateways to a Ground Operations Control Center.

Referring to FIG. 4, there may be a multiple GW 1 shared Confidence Polygon 9, Volume 31 or Surface 33. In this case it is possible to determine how the UT 5 should respond in the presence of two or more GWs 1 by the use of Confidence Polygons 9, Volumes 31, or Surfaces 33. In FIG. 4 two GWs 1 share a common Commercial Service Area boundary. Each GW 1 can construct the same Confidence Polygon 9, or Confidence Volume 31 or Confidence Surface 33. There are several conditions for assignment of the value of CL: both can have the same CL; each can have a different CL; one may have a fixed CL while the other has a dynamic CL that changes with time or any other suitable parameter; or both can have dynamically varying values for CL. Since the GWs 1 can have a communications link between them, as shown in FIG. 5, or by using the PSTN 2, the GWs 1 can coordinate the nature, parameters, and the use of the shared Confidence Polygon 9, Volume 31, or Surface 33. Any of the operating conditions described above may be combined with the multiple GW configuration. Since one or both of the GWs 1 may be moving with respect to the other, the Confidence Polygon(s) 9, Volume(s) 31 and/or Surface(s) 33 may be moving as well.

The operating modes discussed above may be decentralized such that control is exercised locally within a single GW 1. In the case of decentralized control each GW 1 operates to control the use of the Confidence Polygons 9, Volumes 31, and/or Surfaces 33 independently or in cooperation with a neighbor GW 1. However, and referring to FIG. 5, centralized control as an operating mode is also within the scope of these teachings. A centralized Confidence Control System 60 includes a plurality of GWs 1 connected to a Ground Data Network (GDN) 61. Messages move between the GWs 1 connected to the GDN 61, which may serve to exercise cooperation in control of the Confidence Polygons 9, Volumes 31 or Surfaces 33, between the GWs 1 so connected. The GDN 61 is also connected to a Ground Operations Control Center (GOCC) 62 which may serve to exercise centralized control over the Confidence Polygons 9, Volumes 31, and Surfaces 33. The GOCC 62 includes a Local Area Network (LAN) 63 which is connected to the GDN 62, mass storage for data 67, servers 68 and other sub-systems (not shown). In addition, the LAN 63 is connected to one or more Planning Consoles 64 and to an Operations Control Module 65. The Operations Control Module 65 typically includes several functions and submodules. One of the submodules is a Confidence Controller 66 which can act in accordance with information received from the Planning Consoles 64 to affect control over the ensemble of GWs 1 to control the Confidence Polygons 9, Volumes 31, or Surfaces 33 of one or more GWs 1 at a time.

Figure 6:
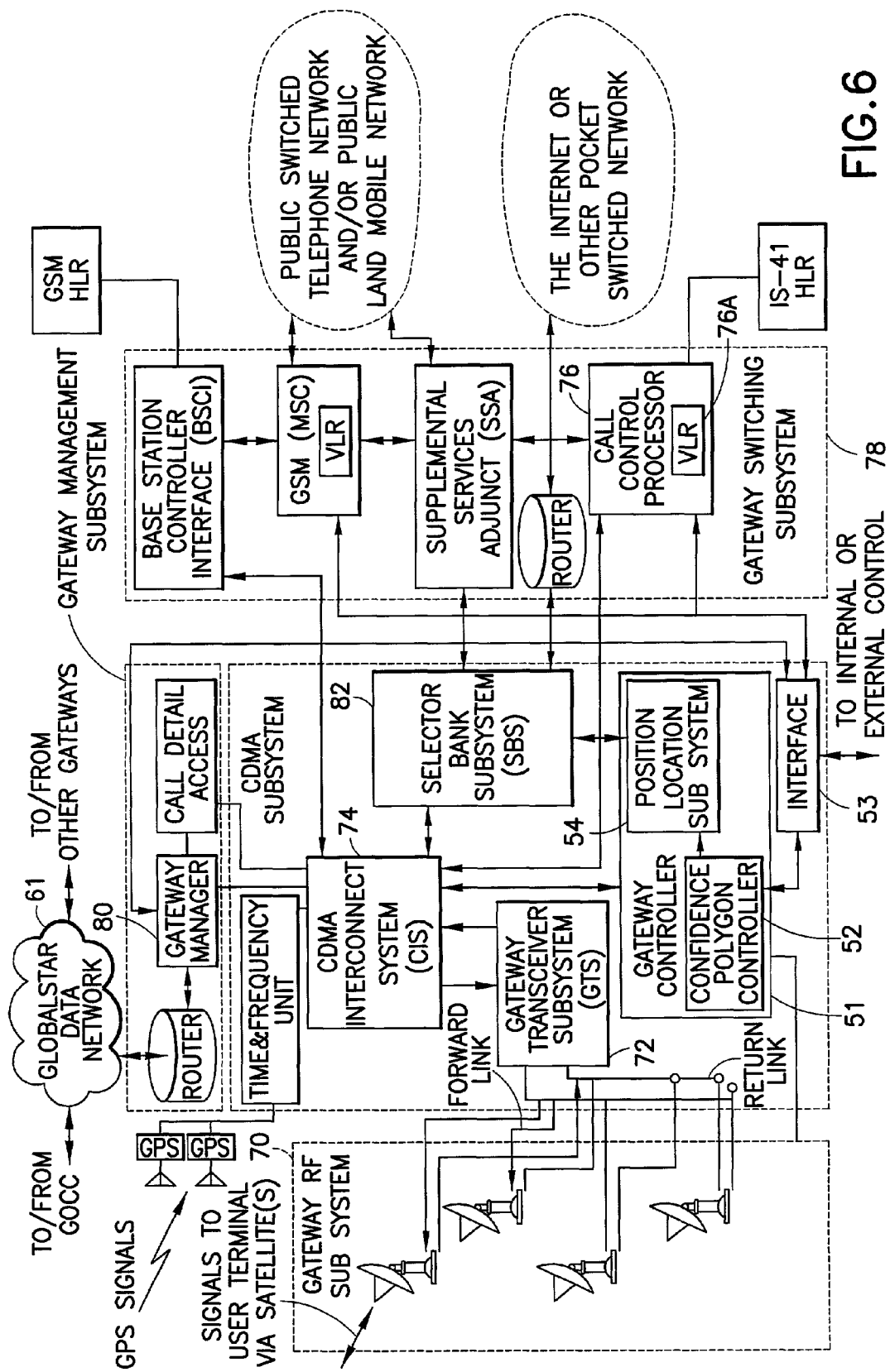
FIG. 6 is a more detail block diagram showing major Gateway sub-systems.

FIG. 6 depicts a GW 1, and shows the collection of equipment used to perform the operations discussed above. The GW 1 is composed of a number of subsystems which are designed to communicate with the UT 5, the PSTN 2 and other networks, such as the Internet. The GW 1 includes a GW RF subsystem 70 for providing Radio Frequency communications to and from the satellites 3. The RF subsystem 70 is connected to the GW 1 Transceiver Subsystem (GTS) 72 by way of an Intermediate Frequency (IF) coupling. The IF in FIG. 6 is labeled Return Link and Forward Link. The GTS 72 is connected to a CDMA Interconnect System (CIS) 74 at baseband. The CIS 74 is the hub of the GW 1 and performs many functions. One of these functions is to route the position request messages and the position response messages to the GW Controller 51. The GW Controller 51 is composed of several modules, one of which is a Position Location Subsystem 54. This module performs the calculations for position location or processes position location information received from the UTs 5. A Confidence Polygon Controller 52 provides the construction mechanism for the Confidence Polygons 9, Volumes 31, and Surfaces 33. In addition, the Confidence Polygon Controller 52 provides values of CL and, if appropriate, th values for the UT position error E. The Confidence Polygon Controller 52 establishes and maintains databases of the Confidence Polygons 9, Volumes 31 and Surfaces 33, and provide descriptive information of same to other GW 1 subsystems and modules. The position location module 54, in addition to calculating the UT 5 position, calculates the value for E if the GW 1 is to perform this task, and compares the value of CL to a value of E obtained from the calculation, or from the UT 5, or from the Confidence Polygon Controller 52. The Confidence Polygon Controller 52 also receives information to control its actions, either for "bulk" control of many or all UTs 5 or for control of a specific UT 5, from an Interface Unit 53. The Interface Unit 53 provides access from a Call Control Processor 76 (which includes the Visitor Location Register (VLR) 76A) located in the GW 1 Switching System 78. This interface provides single or multiple UT 5 control. In addition, the Interface Unit 53 is connected to the GW 1 Manager 80 which allows overall Confidence Polygon 9, Volume 31 or Surface 33 control from the highest level management of the GW 1. An operator console (not shown) that is connected to the GW 1 Manager 80 allows direct manipulation of the databases of the Confidence Polygons 9, Volumes 31 and Surfaces 33 located in the Confidence Polygon Controller 52. The GW Manager 80 is also connected by way of a Router 82 to the Ground Data Network (GDN) 61 which allows centralized control of the databases of the Confidence Polygon Controller 52 from an external controller in the Ground Operations Control Center 62.

An exemplary signal flow for a UT 5 attempting to gain access to the system is now described.

Step 1. The UT 5, either manually or automatically, forms a request for system access (either a registration message, or a call request). This message is transmitted via the satellite 3 or satellite constellation 4 to the GW 1.

Step 2. The received signal is processed by the GW RF subsystem 70 and forwarded to the return link of the GW 1 Transceiver subsystem 72 where it is downconverted and demodulated to baseband. The resulting signal with the request for access is routed to the CDMA Interconnect system 74. A portion of the system access message includes position location measurements, and may include the value of E. These measurements are sent to the Selector Bank Subsystem (SBS) 82 where the CDMA codes are used to extract the digital messages from the received packets of information.

Step 3. The system access request, with the position location measurements is then routed from the SBS 82 to the GW Controller 51 where the message is parsed and the position location portion routed to the Position Location Subsystem 54.

Step 4. The position location subsystem 54 operates on the received measured data to calculate the position of the UT 5. This step may be omitted if the UT 5 transmits its actual position, having done the calculations itself or having obtained its position from some other source, such as the GPS.

Step 5. The GW 1, using a database of information regarding the parameters of the measurements, calculates an error value E. This step may be omitted if the UT 5 transmits its error value E, or if the value of E is supplied by some other source in the GW 1 or external to the GW 1.

Step 6. The value of E is compared to the value of CL provided by the Confidence Polygon Controller 52. If the value of E is acceptable the Position Location Subsystem 54 forms a "Position Location Accept" message and forwards it to the GW Controller 51. If the value of E is unacceptable the Position Location Subsystem 54 forms a "Position Location Reject" message and forwards it to the GW Controller 51.

Step 7. The Position Location Accept or Reject message is then sent to the SBS 82 for inclusion with other messages being sent to the UT 5, which will determine the course of action of the UT 5. Messages to the UT 5 are formed in the GW Controller 51 and, in particular, responses after comparison of CL and E by the Position Location Subsystem 54 are passed to the Selector Bank Subsystem (SBS) 82.

Step 8. These messages, such as position responses, resource allocation and others are then formed by the SBS 82 into packets and forwarded to the CIS 74 where they are further processed and sent to the Forward Link GW Transceiver Subsystem 72 where the signals are modulated, upconverted and passed to the Radio Frequency Subsystem 70 for transmission via the satellite 3 or the constellation of satellites 4. The satellite 3 or the constellation of satellites 4 then repeat the message to the UT 5, although in other embodiments the satellite 3 could include on-board processing to modify the message(s) being sent to the UT 5.

Step 9. After receiving the signal from the satellite 3 the UT 5 downconverts the signal and demodulates it. After demodulation, the signal is processed at baseband to extract the request for access message which includes the position location response message. The UT 5 then functions in accordance with the instructions provided in this message.

The foregoing is a preferred embodiment of the method for using the Confidence Polygons 9, Volumes 31, or Surfaces 33 for controlling the operation of a remote UT 5. However, it should be noted that one skilled in the art, when guided by the foregoing teachings, may derive various modifications to these teachings to accomplish the same functions and actions. Thus, the various operating modes and the like could be realized using different methods and steps.

The UT 5 equipment can be the same as that used for the voice and data services used in the MSS system. No specific changes are necessary for most of the operational modes discussed. Changes in UT 5 software, can be introduced to better utilize the Confidence Polygons 9, Volumes 31 and Surfaces 33 with certain of the operating modes. Since it is possible to effect many different operations by the use of this invention, such as turning on or off of a UT 5 subsystem or device, changing the parameters of an external or internal computer program, changing the state of a device or software implementation, causing a radio frequency device to change frequencies or reduce/increase power, a particular implementation of hardware and software is not required. As but one example of a suitable implementation of the UT 5. one may refer to the disclosure of U.S. Pat. No. 5,655,005, "A Worldwide Telecommunications System Using Satellites, by Robert A. Wiedeman and Paul A. Monte, the disclosure of which is incorporated by reference herein in its entirety.

A general method of the use of this invention by the UT 5 is as follows.

Step 1. The UT 5 performs Step 1 of the method described above for the operation of the GW 1. That is, the UT 5 forms a request for system access (either a registration message, or a call request). This message is transmitted via the satellite 3 or satellite constellation 4 to the GW 1

Step 2. The GW 1 performs Steps 2 through 8 of the method described above.

Step 3. After receiving the signal from the satellite 3 the UT 5 downconverts the signal and demodulates it. After demodulation, the signal is processed at base band to extract the request for access message which includes the position location response message. The UT 5 then acts according to the instructions provided in this message.

These teachings can be employed to control the actions of a UT 5 located at a remote location, far from a GW 1 which has an interface to the Public Switched Telephone Network 2 and/or to the Internet. The invention employs a computer generated and stored database of an Area (Confidence Polygon 9), a volume (Confidence Volume 31), and/or a plane (Confidence Surface 33) to establish a geometric shape located on the earth, above the earth or in space, or combinations of each. In addition, there is assigned to these areas, volumes and/or planes a static or a variable value referred to as a Confidence Limit (CL) that can be compared to a value of the error (E) in position location of the UT 5. The error signal can either be generated by the UT 5 or by the GW 1. A controller, preferably a part of the GW 1, acts upon the database of the geometric shape, and the assigned value of the confidence limit and the error signal to determine if the comparison of the confidence limit and the error, combined with the position of the UT 5, yields a certain result according to the operational mode of the GW controller. There can be many operational modes of the controller. Depending on the operational mode the result of the comparison of the confidence limit assigned to the area, volume or plane is used to affect control of the UT 5 or an external device attached to the UT 5.

Having thus described the overall operation of the MSS in light of this invention, a more detailed description will now be provided of certain aspects of these teachings to aid in a further understanding and comprehension thereof.

Figure 7:
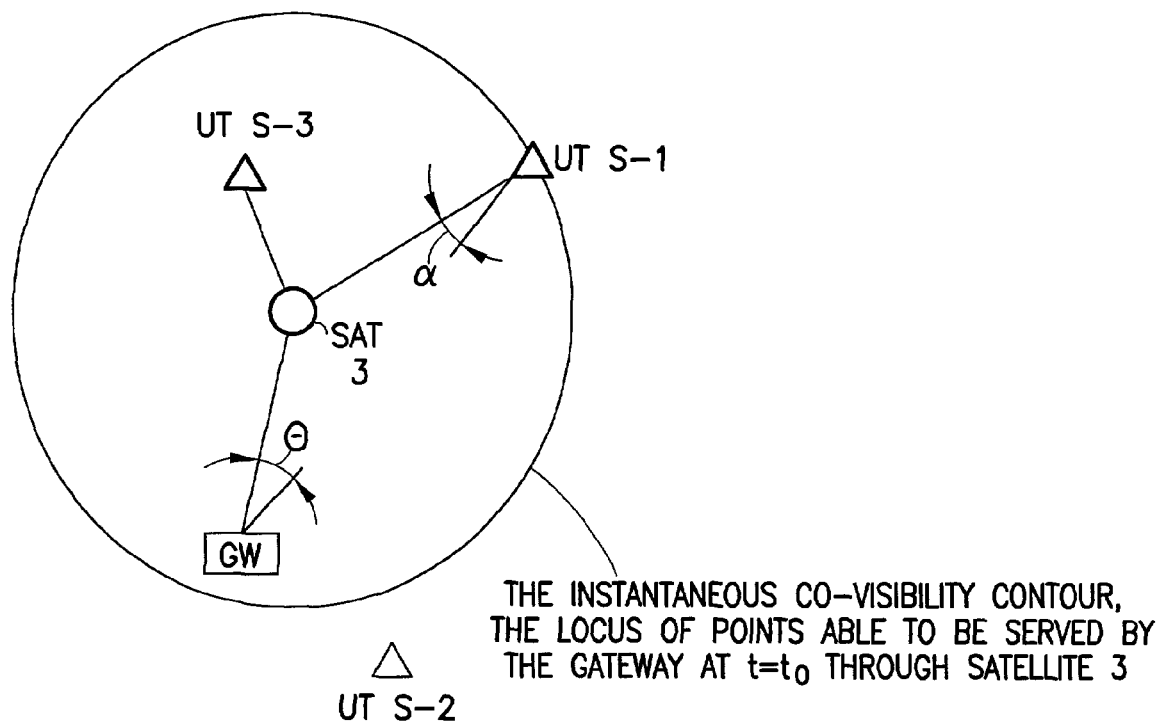
FIG. 7 is a diagram showing an instantaneous co-visibility contour or locus of points able to be served by a gateway through a particular satellite.

A region of co-visibility of Radio Resources availability to the GW 1, the equivalent to cells in a cellular system, are generated by the design of the satellite system antennas and beams, the motion of the satellites 3 in their orbits and the arrangement of the GWs 1 on the surface of the earth. The following discussion, made in reference to FIG. 7, describes why this is true.

An earth station or GW is placed at a random location on the surface of the earth. A satellite 3, which may be a repeating type, is shown orbiting near the GW 1 and has a beam, which may include sub-beams, that covers the GW 1 with Radio Frequency (RF) energy. The GW 1 tracks the moving satellite 3 and is able to communicate with it. There are a plurality of UTs 5 on or near the surface of the earth, some located within the coverage area and some not. In the example, UT 5-1 and UT 5-3 are able to communicate with the GW 1 over the satellite relay, while UT 5-2 is not able to. When the UT 5 is able to communicate with the GW 1 co-visibility is available. The instantaneous distance from the GW 1 to the extent of the instantaneous co-visibility contour is determined by the altitude of the satellite 3 and the individual minimum elevation angles required by the UT 5 and the GW 1 that will support communications links. If the satellite 3 were stationary the co-visibility contour, also called the locus of points able to be served by the GW 1 at $t=t_0$, would be as shown in the Figure. In this case UT 5-2 would not be served by satellite #1. The presently preferred MSS uses low earth orbit satellites 3, which means that the satellites are in motion relative to the earth-bound GW 1.

Figure 8:
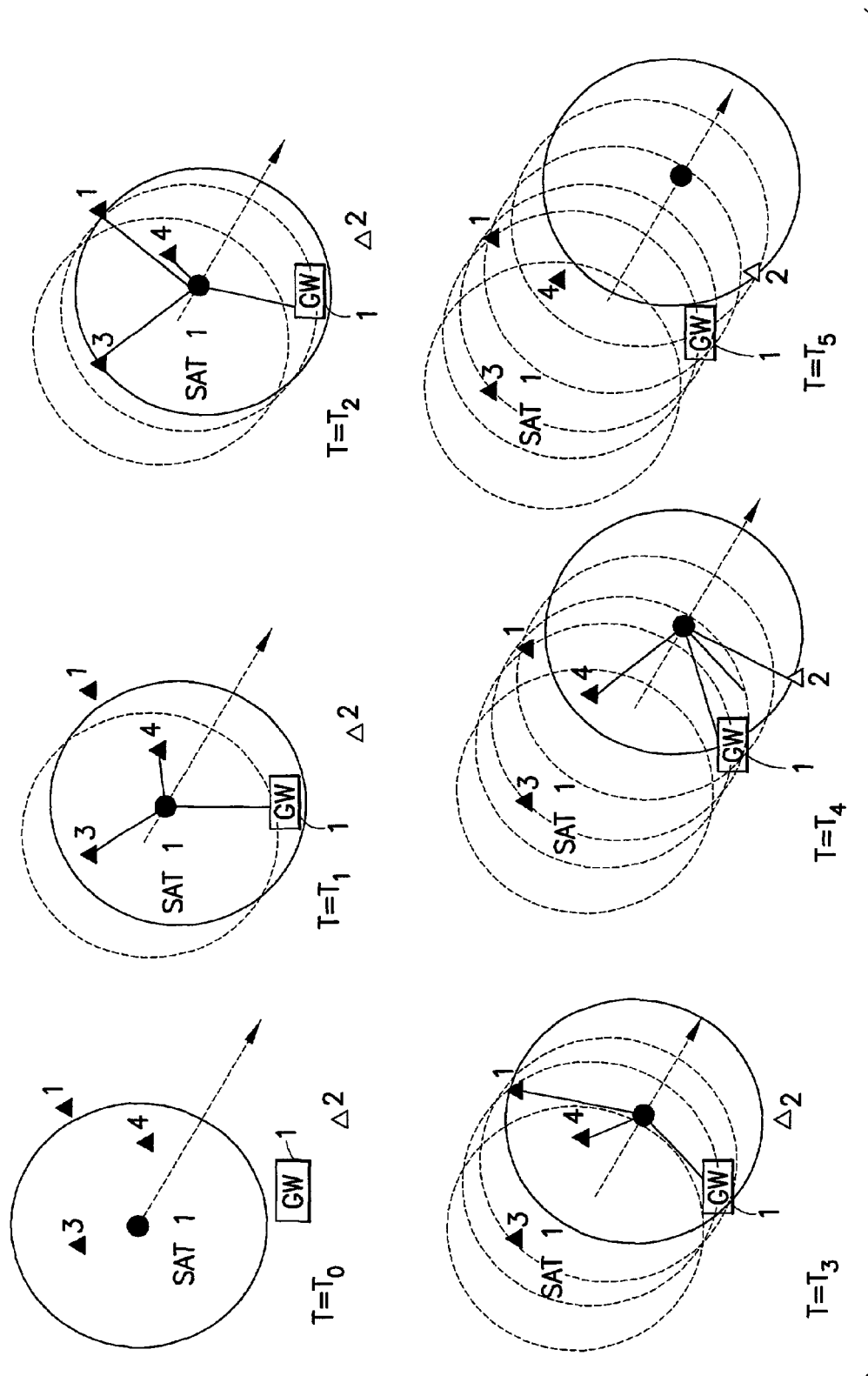
FIG. 8 is a diagram showing the instantaneous co-visibility contour at different points in time due to motion of the satellite.

Consider now the example shown in FIG. 8, where satellite geometry is shown for six periods of time. Four UTs 5 are located in a region around the GW 1. At $t=t_0$ satellite 3 has not yet covered the GW 1 and no UT 5 5s are being served. At $t=t_1$ the GW 1 has been covered by the RF beam on the satellite repeater, and two UT 5 5s, #3 and #4, are able to be served. At $t=t_2$ the GW 1 is able to not only serve #3 and #4 but UT #1 as well. At $t=t_3$ the satellite 3 is no longer able to serve UT #3 but continues to serve UTs #1 and #4. At $t=t_4$ the satellite 3 is no longer able to serve UT #1 but continues to serve UT #4 and now can serve UT #2 as well. At $t=t_5$ the satellite 3 no longer serves any UTs since it cannot "see" the GW 1. In this example, $t=t_1$ to $t=t_4$ is the time of the satellite pass. As can be clearly seen, UT #4 had continuous coverage by the satellite 3 during the entire pass. In fact, any UT 5 within the satellite coverage area would have had continuous coverage. For the period $t=t_1$ to $t=t_4$, this region is a location area where radio resources are continuously available and represents the equivalence to a set of terrestrial cells continuously having available radio resource. Certainly, this region is not in space, nor is it moving.

Figure 9B:
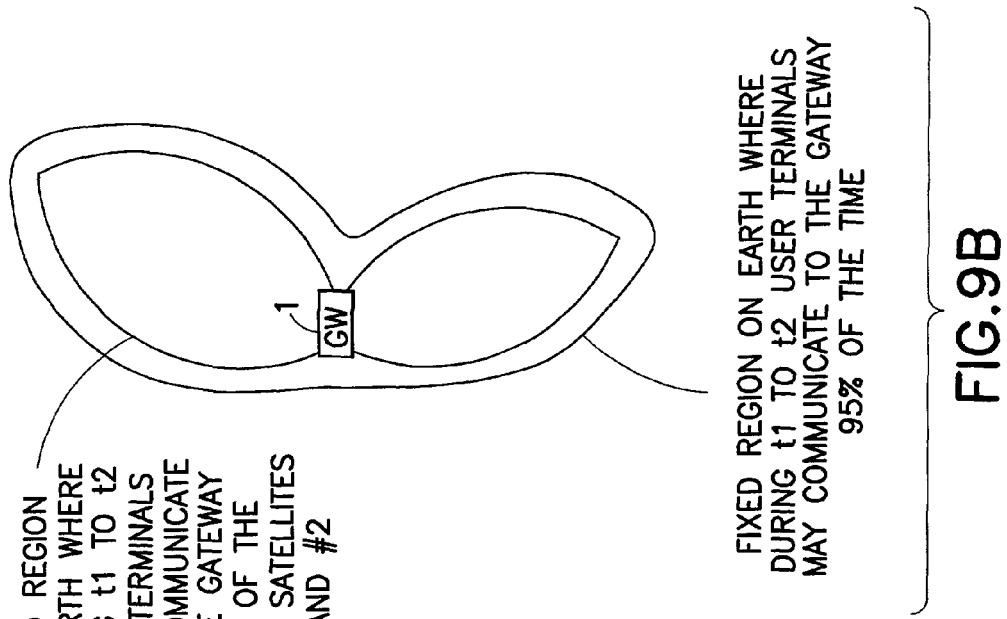
FIG. 9B shows two regions wherein user terminals have 100% and less than 100% availability for two of the time periods of FIG. 9A.
Figure 9A:
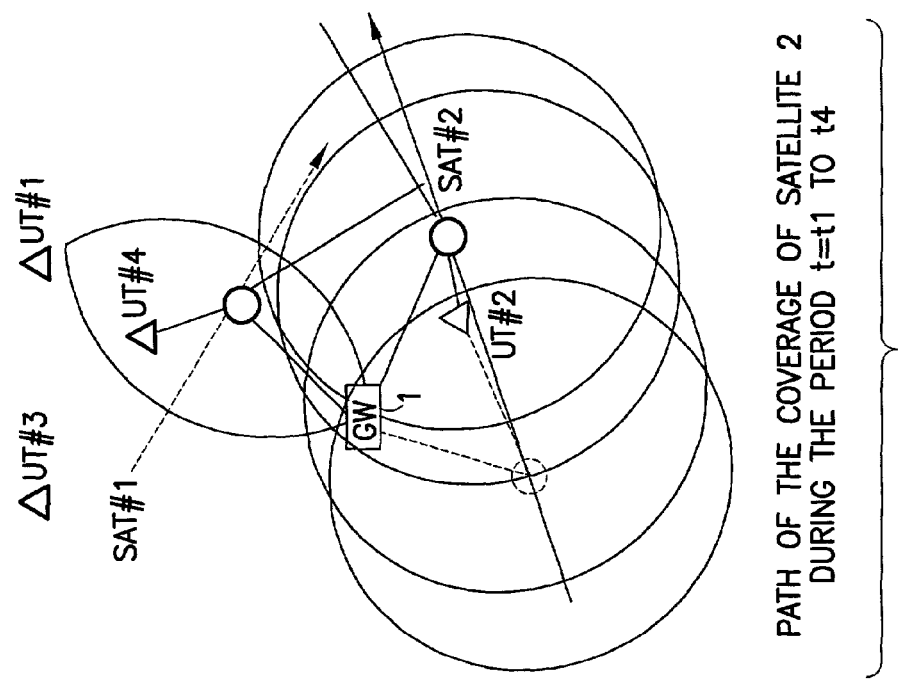
FIG. 9A shows a path of coverage of a satellite during four of the time periods depicted in FIG. 8.

Now, extending this to the case for multiple satellites, reference is made to FIG. 9A. In this Figure a second satellite #2 is added to the geometry over the same time period $t=t_1$ to $t=t_4$. Satellite #2 is on a different path since its orbit is different. As shown at $t=t_1$ the GW 1 is able to communicate to the satellite #2 as well as satellite #1. Since the UT #2 is within co-visibility of both itself and the GW 1 through satellite #2, communications can take place. As the satellite #2 moves along its orbital path it can continue to communicate with UT #2 until $t=t_4$. As in the case of the satellite #1 a fixed area on the earth is created during the time period for satellite #2 wherein continuous communications is available. Since these two fixed areas are created during the same time period they together form the area on the ground where radio resources are continuously available and represent the equivalence to a terrestrial cells continuously available radio resource. Again, this area is not in space nor is it moving with the motion of the satellites.

FIG. 9B shows a contour of a composite fixed region on earth where during the time period $t=t1$ to $t=t4$ UTs 5 may communicate continuously to the GW 1 100% of the time via satellites #1 and #2. If the system designer does not require 100% radio resource availability a contour which is larger than the 100% contour may be developed.

The above example without scale and actual configuration is provided to illustrate the principle. Generally, the continuous communication co-visibility region (equivalent to a continuous propagation cell of a terrestrial system) is determined by mathematical modeling of the satellite antenna beam configurations, the satellite constellation and the location of the GW 1. The size and shape of the region depends on the constellation of satellites, and on the latitude of the GW 1. This region can be defined further by other factors than a line of sight mathematical model. Factors such as blocking and shadowing of the UT 5 by buildings, trees and other obstructions, as well as UT 5 performance may be used to further modify the region of co-visibility and available radio resource.

Figure 10:
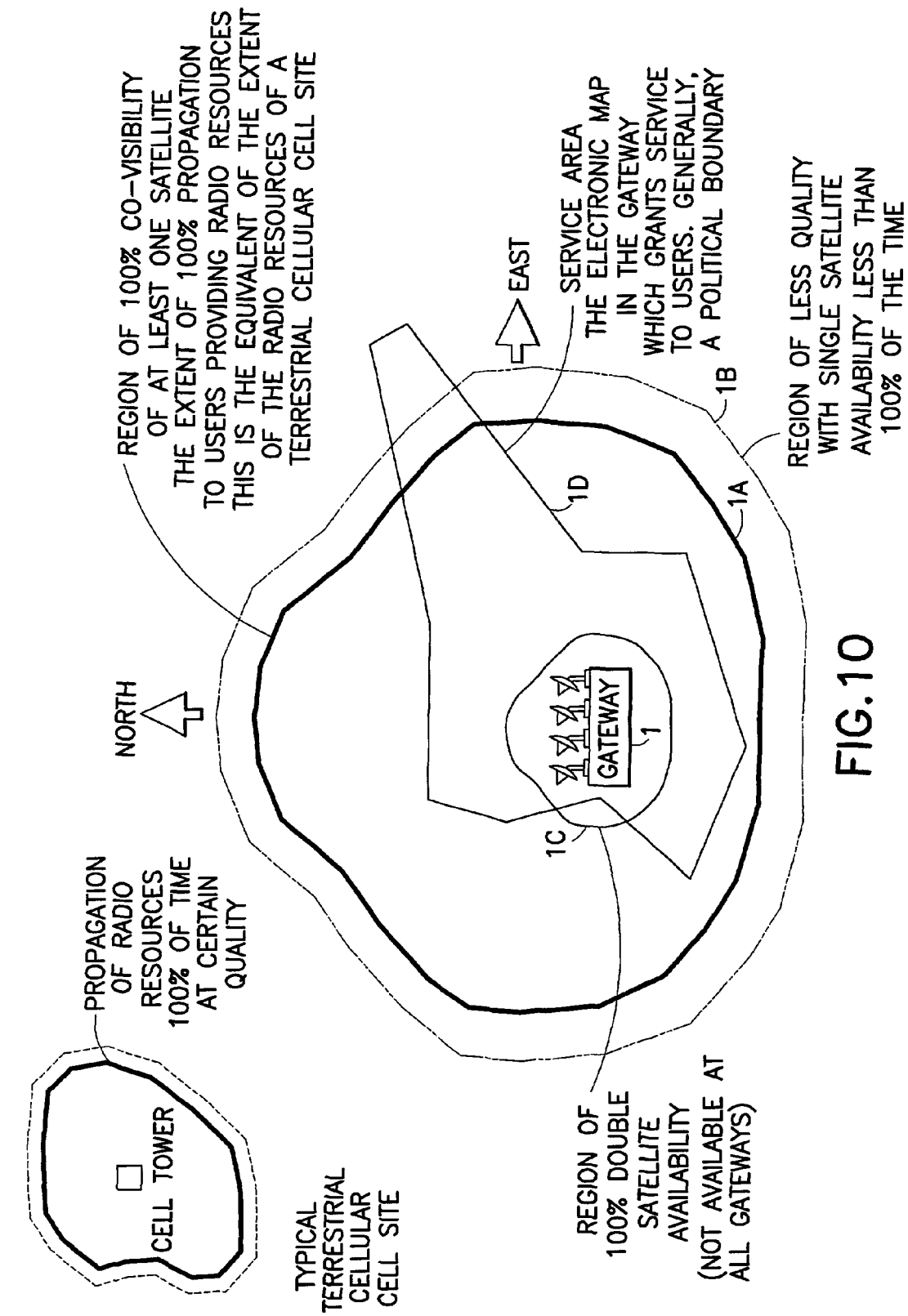
FIG. 10 shows a typical co-visibility contour plot for a northern latitude gateway in the presently preferred mobile satellite communication system.

FIG. 10 shows a typical Co-Visibility Contour Plot for a Northern Latitude GW 1 using the presently preferred constellation. The heavy dark line 1A represents the fixed region on the earth where there is 100% propagation to UTs 5 providing Radio Resources in the same manner as the terrestrial cell site shown in the upper left hand corner. The dashed line 1B outside of the 100% contour is a region of less quality that the service provider may choose to use depending on the economics of service. The same equivalent is found in the terrestrial system. Also shown in FIG. 10 is a region of 100% double coverage IC. This area does not exist for all GWs 1. In any case, the actual service area of the GW 1 does not generally conform to the contours, but instead is determined by political boundaries, such as country borders, or other economic boundaries. This area 1D, lying within the contours, is generally an electronic map held in the GW 1 computing system memory. UTs 5 requiring access to the system must be within this map area.

The system operates by UTs 5 requesting service registration. The UT 5 requests service by transmitting a service request. The UT 5 is position located by the GW 1. If the UT 5 is within the service area, and is co-visible to the GW 1, the UT 5 is granted service. If the UT 5 is outside of the electronic map boundary 1D the UT 5 is denied access.

The electronic map area ID may not include much or any of the 100% double coverage area. It generally has a large amount of 100% single satellite coverage, and may have significant areas with less than 100% single satellite coverage.

In the presently preferred embodiment the UT 5 transmits on one of nine contiguous channels in the 1610-1621.35 MHz band. These channels each occupy 1.23 MHz and are operated using CDMA signals which are spread spectrum. Channels 1, 2 and 3 are assumed to lie within the Radio Astronomy band. The UT 5 power is controlled by the GW 1, and always transmits at the lowest possible power to complete the link. When the UT 5 has a clear line of sight to the satellite 3 the average transmit power is approximately 100 mW or 20 dbm (voice mode). The UT 5 has the capability of transmitting at a maximum power of 450 mW or 26 dbm, however, the UT 5 does not reach this value when transmitting voice. The UT 5 transmits at maximum power only in certain circumstances (e.g., when transmitting data with the antenna blocked to all satellites in view), and only for a short period of time. Therefore, Radio Astronomy protection can be calculated using average power conditions.

The values of transmission power for the UT 5 are variable and change according to instructions issued on a control channel, or they can be appended to the traffic signal by the use of inband signaling. The power transmitted in the direction of a Radio Astronomy site is reduced significantly in the bands of frequencies equivalent to the $2^{nd}$ and $3^{rd}$ or more 1.23 MHz channels below the operating channel.

The values of the out of band emissions are interpreted as follows (e.g. X-2): 47/57 dB below peak means that when the UT 5 is transmitting at maximum power in channel "x" the emission in the second 1.23 MHz band segment below channel "x" is 47 dB down. Likewise, for average power the emission is 57 dB below the avg. power. The above reduction of power in the band of frequencies equivalent to X-2 results in emission powers of −82 or −92 dbW/kHz for Maximum power and Average power respectively.

Since the values of transmit power in the equivalent channels X-2, X-3 and higher are in the picowatt/4 kHz level the coordination distance with respect to any transmission in the 1610.6-1613.8 MHz band is minimized.

A regulation process has calculated a conservative coordination distance of 160 Km and 50 Km for Radio Astronomy Spectral Line observation sites and Radio Astronomy Very Long Baseline (VLB) sites, respectively. UTs 5 operating on channels 5,6,7 and above have significantly reduced coordination distances as shown in Table 1.

TABLE 1

Reduction in Coordination Distances when Operating on Channels above 1, 2 & 3

| Site Type | Ch 3 | Ch 5 | Ch 6 | Ch 7 & above |
|---|---|---|---|---|
| Spectra 1 | 160 km*. | 13 km | 7 km | 3 km |
| VLB | 50 km* | 7 km | 3 km | 3 km |

*Based on a conservative calculation not using terrain blocking and other interference mitigating effects.

While these distances are small it is desired to prevent the use of any UT 5 when within the Zone. It is known that there may be interference between Mobile Earth Terminals (MET) operating in the Mobile Satellite Service (MSS) and stations of the Radio Astronomy. The amount of interference depends on a great deal of factors, but for the purposes herein is discussed in terms of the values of out of band emissions of the MSS UT 5 and the distance of the UT 5 from the radio astronomy site.

The above-referenced exclusion zones 8 are used to prevent transmission by UTs 5 above values which correspond to an increase in the noise detected by a Radio Astronomy receiver. These exclusion zone sizes depend on the emissions of the UT 5 and a number of factors regarding the Radio Astronomy site (such as terrain blocking, etc.) Creating the exclusion zones may be accomplished in several ways.

A GW 1 editor, a computer program located in the GW 1 computing system, can be used to create any number of closed polygons 9 of arbitrary size and shape. The polygons 9 may have up to 2000 or more points or nodes which are automatically connected to form the Polygon 9. The points do not need to coincide with any GW 1 grid squares or GW 1 Commercial Service Area 7 but could, by example, conform to a 10 km by 10 km position location grid. The input to the GW 1 editor for the nodes is latitude and longitude of the node. As was described above, within this Polygon 9 a service provider, using the GW 1 editor program, can set a "confidence" level to be satisfied by the position location module when registrations or call requests are made on the system. Simply setting the confidence value to ZERO (0) requires that the position location have no variation in order to accept the call. Since no call can achieve this level of accuracy all calls within the Polygon 9 will fail.

The size of the exclusion zone can be calculated by several means and each regulatory body may require a different technique to perform the calculation. The technique may or may not include terrain blocking factors, propagation models or other specific calculation factors.

With regard to UT 5 position location, the presently preferred MSS system uses the multiple satellite constellation 4, with a plurality of satellites orbiting overhead. In the presently preferred embodiment the satellites 3 are in a 1414 km circular orbit, inclined at 52 degrees, and arranged in 8 planes spaced 45 degrees apart, the number of satellites available to the UT 5 instantaneously is considerably smaller than that of the GPS system. In addition, the satellites 3 and GWs 1 may not have the best Geometric Dilution of Precision (GDOP) compared to GPS for making precision position location calculations. In fact, normally only 2 or 3 satellites are available. In some instances, especially above 60 degrees North or South, and between the equator and 20 degrees North or South, there may be only one satellite connected to the GW 1 which is able to contribute to the position location function. As was shown above, a satellite 3 is moving relative to a fixed location on the ground, and the satellite fields of view are projected onto the surface of the earth.

Various techniques for calculating the position of a UT 5 within the fields of view can be used. GPS and other multiple satellite systems first calculate a number of parameters describing the geometric relationship between the satellites and the UT 5. Then triangulation calculations are performed using a range parameter describing the distance between the satellite and the UT 5. Each range parameter represents a sphere centered on the measuring satellite. The possible solutions are described by the intersection of these spheres and the surface of the earth. If three satellites (ranges) are available there is no ambiguity and the location of the UT 5 is absolutely determinable within some error based on the accuracy of the measured ranges. However, if less than three satellites (ranges) are available then one of two ambiguity cases exist, i.e., either two range ambiguity or range and range rate ambiguity. U.S. Pat. No. 5,920,284 presents one technique of resolving these ambiguities and employs satellite beam identities.

However, the satellite beams of many the low earth orbit systems are too large to effect timely position location and resolving of the ambiguity, and another technique may be necessary.

The preferred method of position location uses measurements of range to a satellite made by the UT 5. After making these measurements the UT 5 transmits the measurement back to the GW 1 on the return link as part of various messages required and defined in the air interface specification. In turn the GW 1 uses the range information and the times made to calculate the location of the UT 5. The communication system uses CDMA as a modulation scheme and a Pilot CDMA code transmitted in a specific traffic channel for synchronization and elimination of self interference. The Pilot is transmitted by the GW 1.

The UT 5 performs measurements of the range to the satellites that it is using for tracking pilots in the active set (satellites and beams which have pilots and are co-visible with the satellites UT 5 and the GW 1), with special treatment of the satellite 3 which is sending the UT 5 its paging channel, referred to as a reference satellite. The UT 5 stores the following information: (a) the identifier of the reference satellite, (b) the identifier of the measured satellite, (c) a signed time difference between that of the measured satellite and the reference satellite (the start time of the outer PN cycle of the reference satellite and the next start of the outer PN cycle of the measured satellite (within $\frac{1}{8}^{th}$ of a chip), (d) the carrier frequency offset between that of the nominal carrier of the reference satellite and that of the measured satellite, and (e) the system time of the measurement derived from the reference satellite (within 1.25 ms).

These measurements are taken for at least three satellites within 1 ms of each other. These measurements are stored according to the following Rules: (a) minimum records=2 satellites or the number of satellites the UT 5 can receive, (b) maximum records=3 satellites, if the UT 5 can receive more than three Pilots it uses the three strongest, (c) the most recent set has at least two satellite records, and UT 5 discards all others, and (d) if the UT 5 only sees one satellite 3 then it stores only the most recent position record. In addition, the UT 5 stores its most recent sets from multiple satellites, if they exist. Further Rules include: (e) when transmitting an access probe the position records have been taken within 0.2 seconds of start of the access probe (200 ms), (f) if the current system time exceeds the system time stamp by more than 650 sec (about 11 minutes) the UT 5 discards the data, and (g) the UT 5 discards the data if the UT 5 changes GWs 1.

The measurements of the various satellites 3 are transmitted to the GW 1 by the UT 5 and are used in the position location calculation module 54, as discussed above with reference to FIG. 6.

By way of further explanation, and referring to FIGS. 11A-11I, it is noted that the gateway coverage of a multiple satellite system does not equate to the moving fields of view of one or even more than one individual satellite 3. This is true for a low earth orbit satellite system. There is a collection of satellite fields of view, which contain multiple beams that are in constant motion over the UT 5. This collection of satellite Radio Frequency Beams creates at points on the ground a composite radio frequency Power Flux Density (PFD). Coverage of a UT 5 depends on the value of the PFD received by the UT 5. If the UT 5 receives a sufficient PFD it can be connected to the earth station (GW 1) via the satellite 3. If insufficient PFD is received the UT 5 cannot be connected to the earth station via the satellite.

Figure 11A:
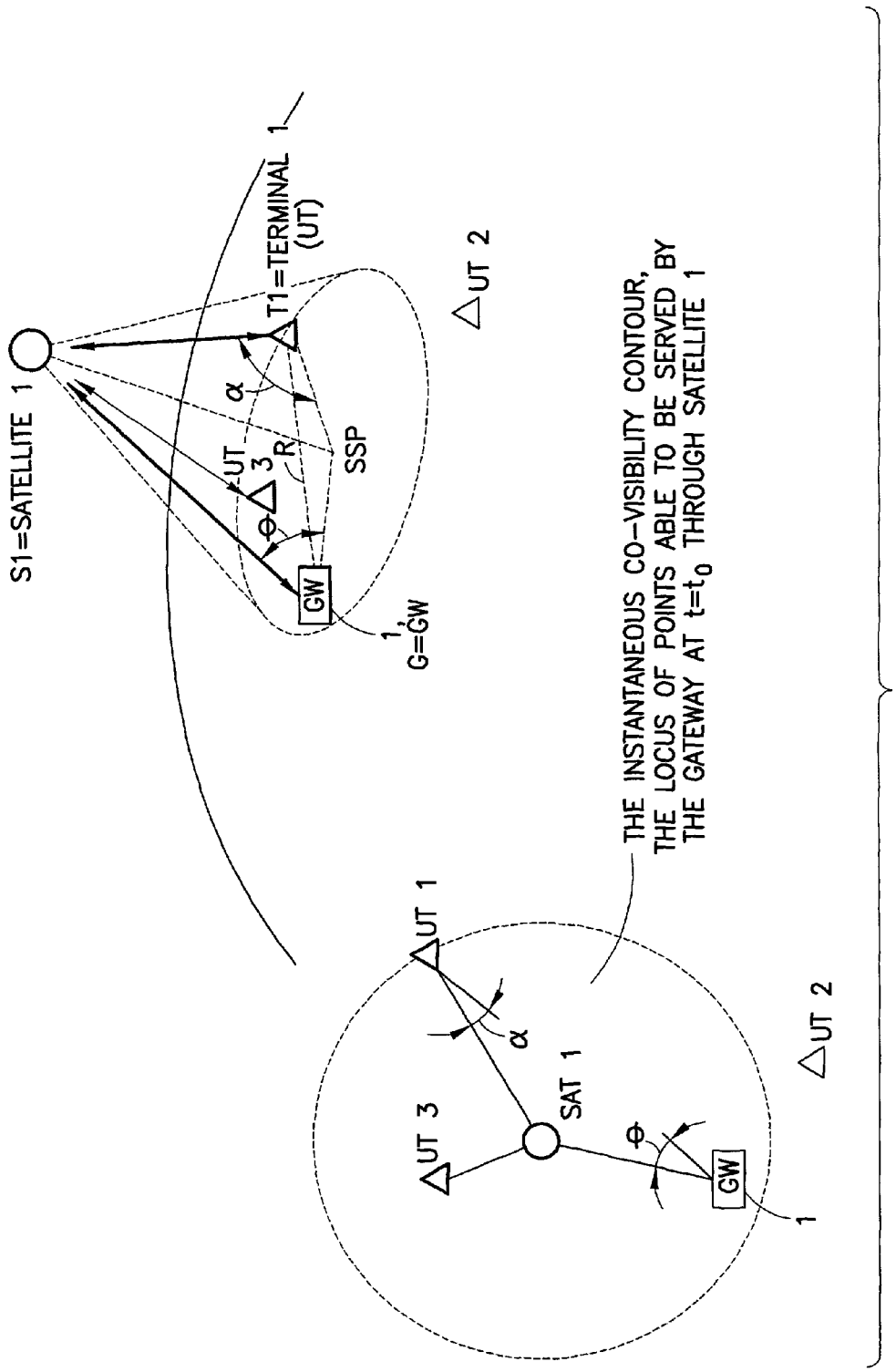
FIGS. 11A-11I are useful in understanding various aspects of co-visibility, gateway coverage areas and power flux densities (PFDs).

Referring to FIG. 11A, a satellite #1 is orbiting the earth. It is receiving and transmitting signals from and to an earth station (GW 1) over a link (Link 1). A UT 5 is located on the earth (or above the earth, e.g., on an airplane)), and is communicating to the GW 1 over another link (Link 2). At an instant in time the geometry of FIG. 11A exists. For a communications link to be formed there must be co-visibility between the GW 1 and the UT 5 via a satellite 3. In a practical system the GW 1 transmits toward the satellite 3 at a minimum angle of theta which is formed between the Link and a line between the GW 1 and the Sub Satellite Point (SSP). This construction forms the triangle G-SSP-S1 on the diagram. The satellite #1 receives the signal, amplifies it, and retransmits the signal toward the ground. It is received by the UT 5 at some distance from the SSP. Depending on system design, the power transmitted by the satellite 3 (#1) is designed to create a PFD at a certain radius from the SSP. For practical reasons there is a minimum angle alpha between the UT 5 link to the satellite 3 and the line connecting the UT 5 and the sub satellite point (SSP). For practical reasons, a minimum useful angle is about 10 degrees. This construction creates another triangle T1-SSP-S1 on the diagram. Using spherical and plane trigonometry one can create the triangle G-S1-T1 which has a distance from the GW 1 to the UT 5 equal to R, the radius or distance from the earth station (GW 1). Moving the UT 5 around the surface of the earth at a constant distance from the sub satellite point (SSP) creates an instantaneous region of co-visibility which has sufficient PFD to make a communications link to the UT 5. Note that the region of co-visibility need not be circular, but is defined by the antenna pattern and by the PFD created by it, and any UT 5 situated at the distance SSP-T1 from SSP will receive an equal PFD, if the design of the satellite antenna and the transmitted power of the GW 1 is tailored to create an equal PFD. That is to say, any UT 5 located on or within this instantaneous locus of points, called the instantaneous co-visibility contour, is able to register, make calls, and sustain communications. Thus, in the diagram UTs 1 and 3 can complete RF links to the GW 1, while UT 2, located outside of the locus of points cannot.

Figure 11B:
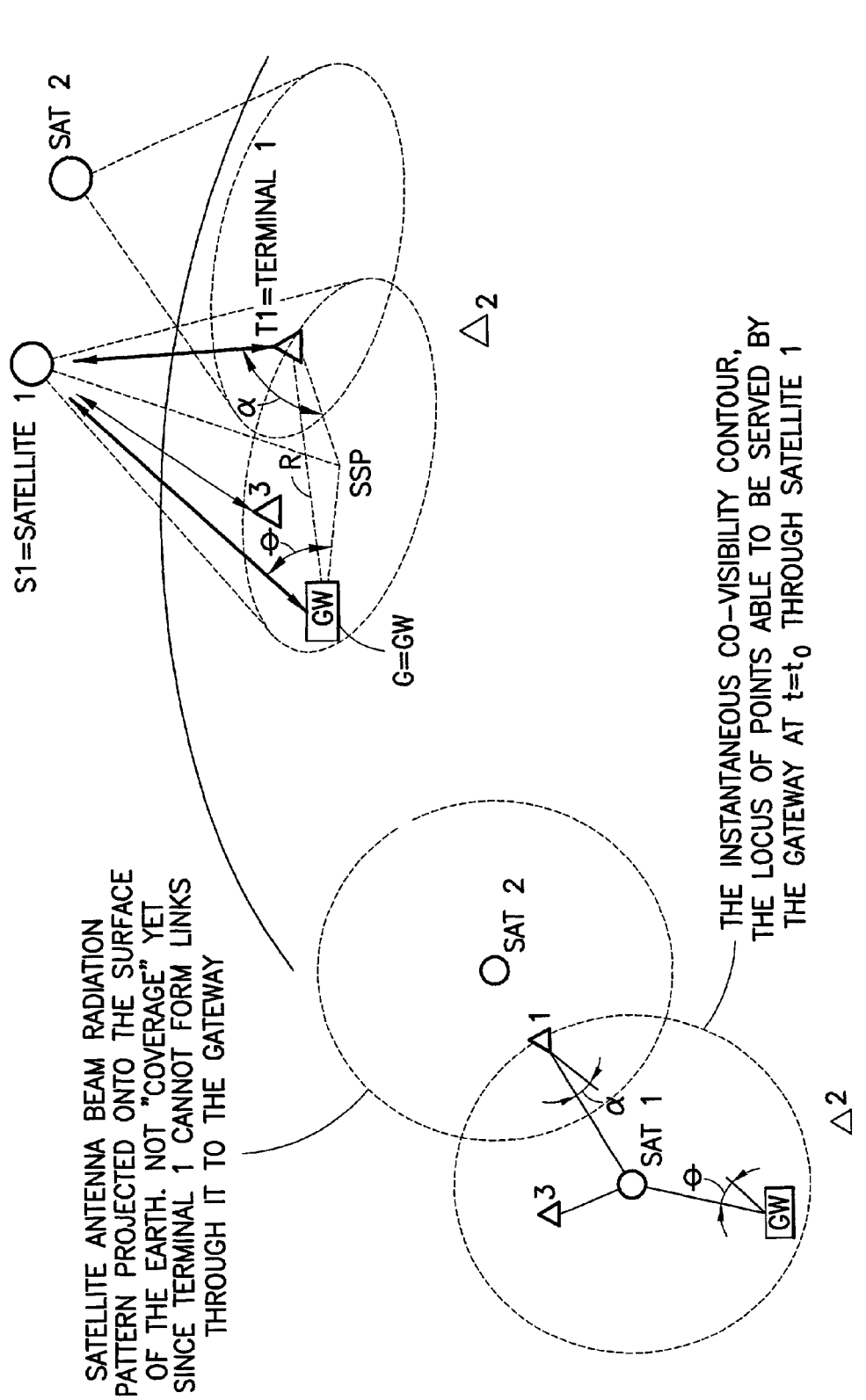

Modifying the Figure by adding a satellite which has its RF beams covering UT 5, but not the GW 1, is shown in FIG. 11B. A second satellite (#2) has moved into the area where the UT #1 is active, however, the UT #1 cannot use the satellite even though its RF beam is covering it since satellite #2 is not able to cover the GW 1 with its RF beams. The situation with UT #1 has not changed and, therefore, there is no reason for UT #1 to re-register. As such, it can be appreciated that the mere movement of satellite visibility footprints or RF antenna patterns across the surface of the earth does not create a need for mass re-registrations by the UTs 5.

Figure 11C:
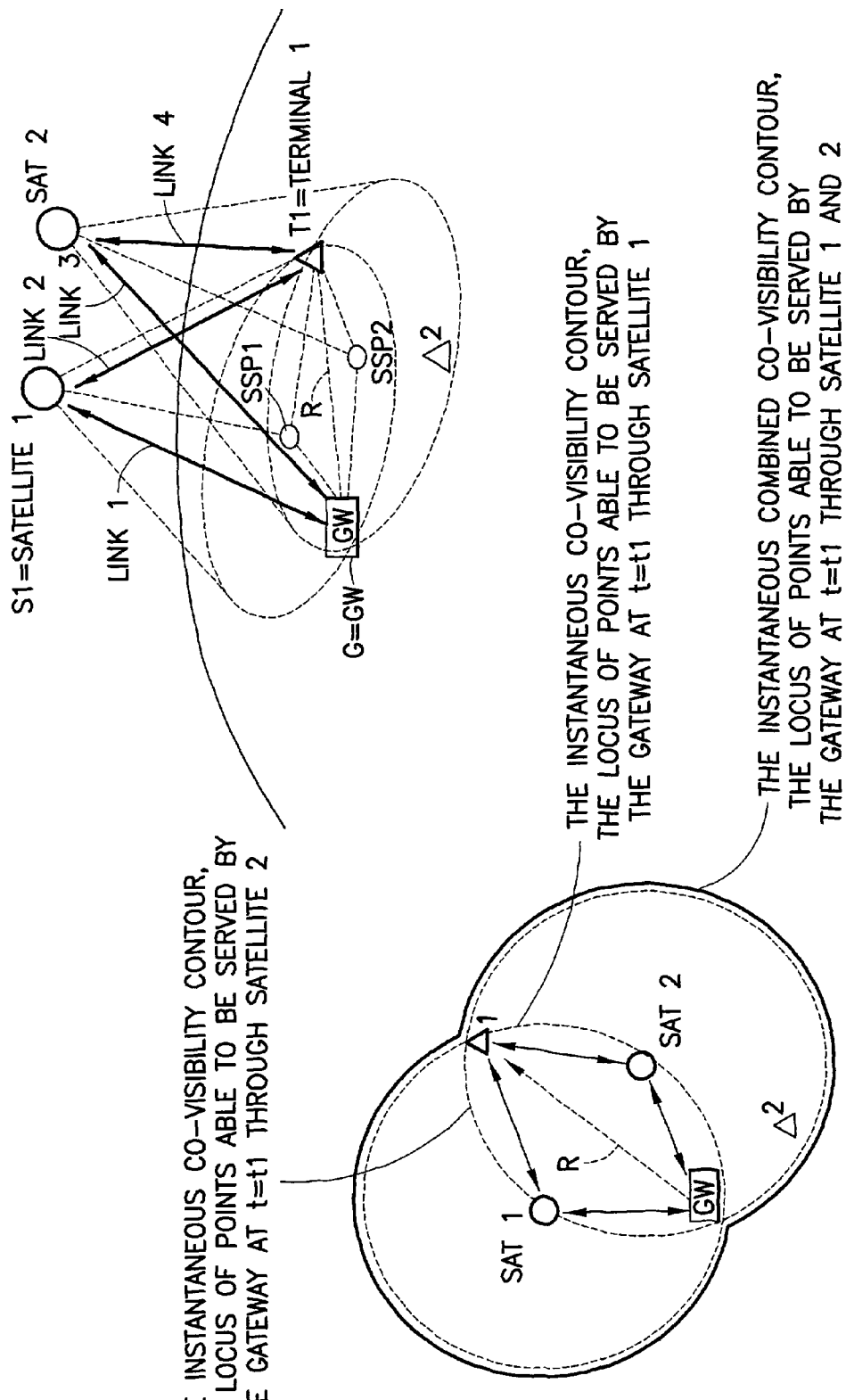
Figure 11D:
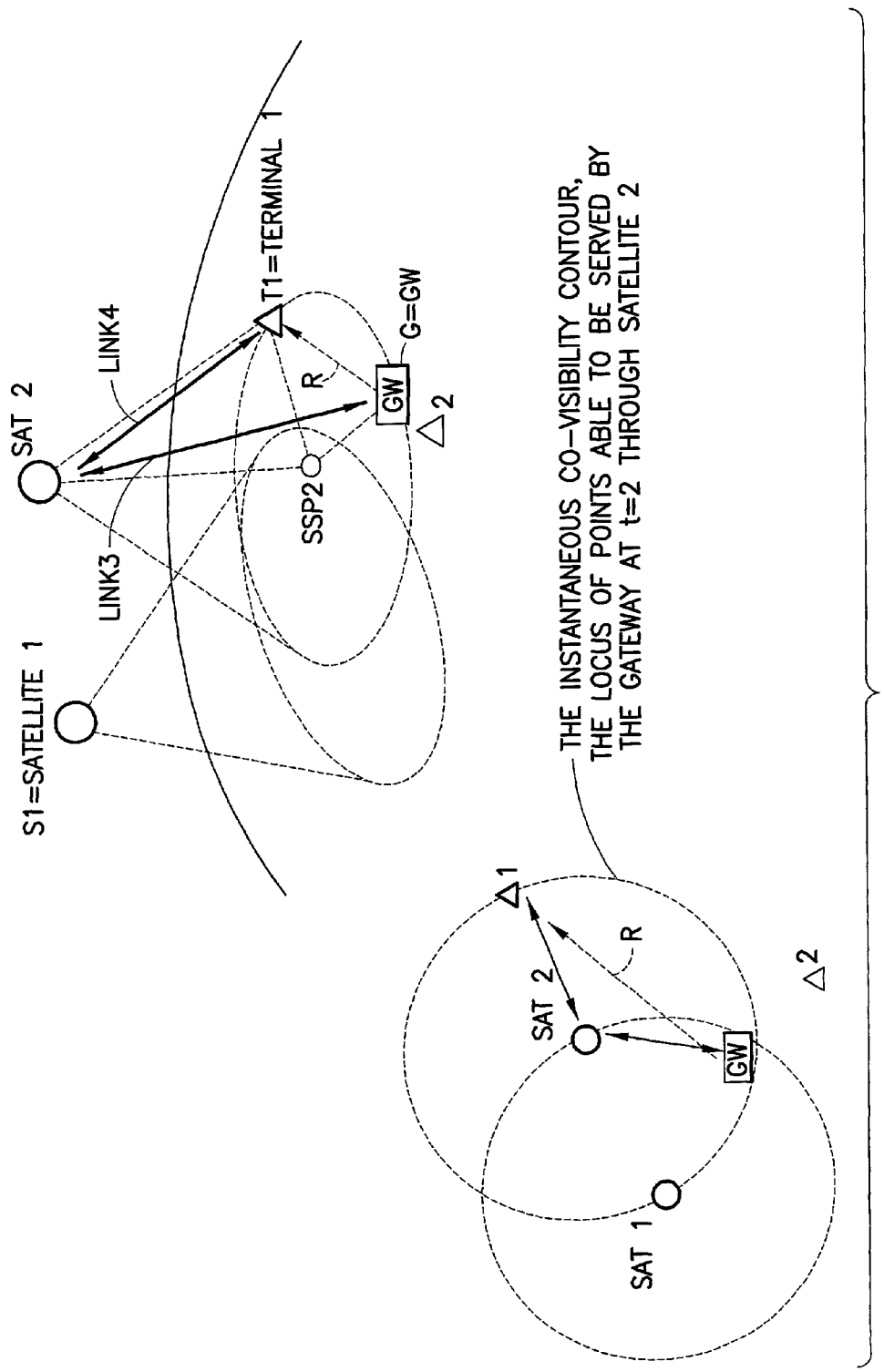
Figure 11E:
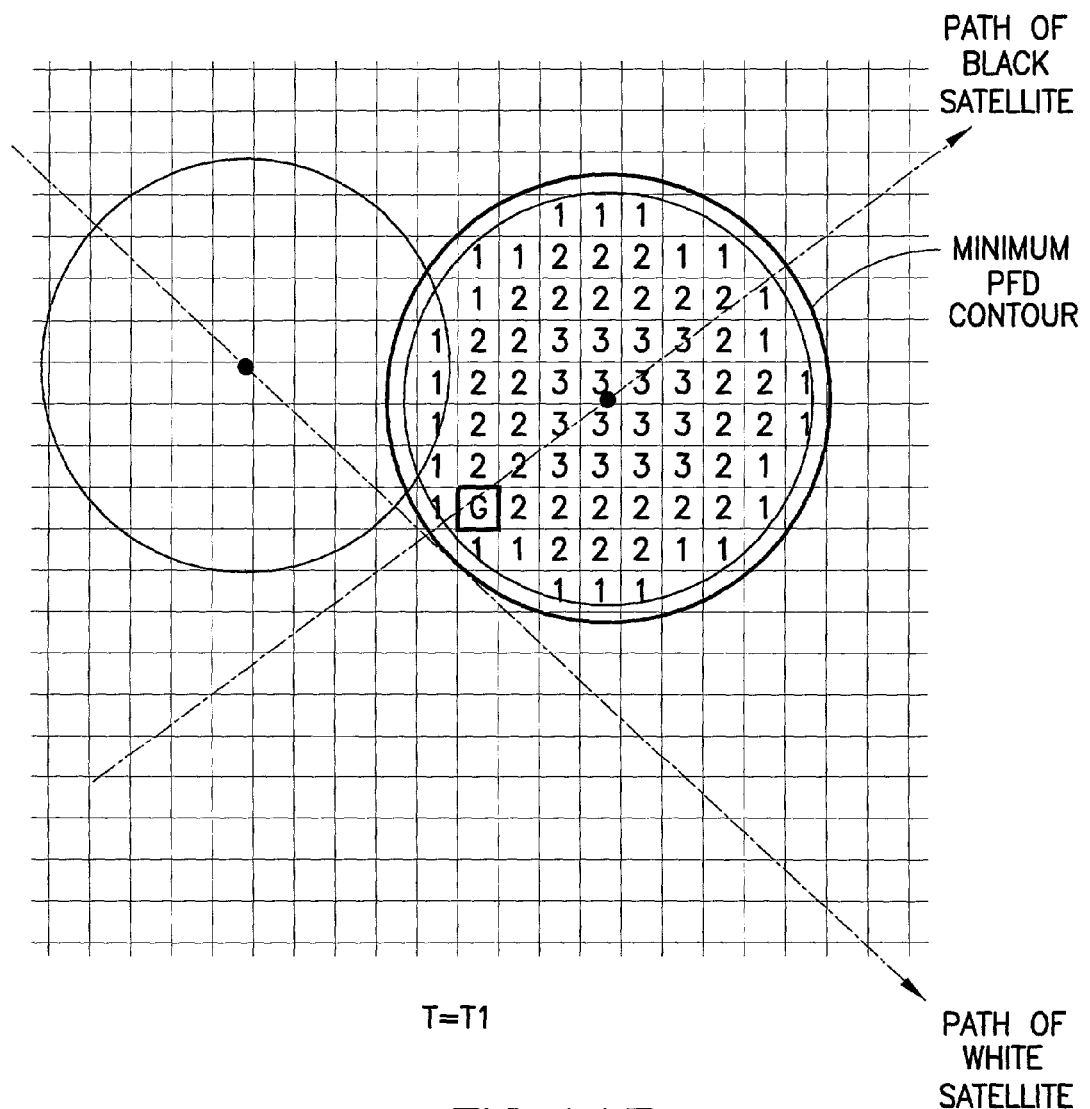

Moving this configuration in time until both satellites #1 and #2 can communicate with the GW 1 yields FIG. 11C. At this time satellites #1 and #2 have moved in space sufficiently that satellite #2 can receive signals from the GW 1. UT #1 is located on the edge of the coverage area of both. The GW 1 senses the presence of UT #1 in the received signal from satellite #2 and begins to transmit to the UT #1. Link #3 is formed from the GW 1 to satellite #2 and after amplification the satellite #2 transmits the signal on Link 4 toward the ground. The signal is received by the UT #1 at some distance from the SSP. The Link triangles GW-SSP2-S2 and T1-SSP2-S2 are formed as discussed above for satellite #1. Likewise, in a similar manner to that above, using spherical and plane trigonometry the triangle GW-SAT2-T1 is formed and it shares the same R or radius of location from the GW 1. Since the radiation patterns of satellites #1 and #2 are assumed to be about the same, the PFD at the edge of coverage is the same. The UT #1 is thus communicating via two different satellites #1 and #2 at the same time. Notice that the movement of the satellite visibility footprints or RF antenna patterns across the surface of the earth did not create a need to re-register the UT #1.

For a period of time both satellites continue to communicate with the UT #1 located at R distance from the GW 1. Now, and referring to FIG. 11D, satellite #1 has moved such that it can no longer communicate with UT #1, therefore Links #1 and #2 are no longer formed. However, satellite #2 is still in communication with UT #1, located at a radius R from the GW 1, over Links 3 and 4 and is operating at the same received PFD as before. Notice that there was no need to re-register the UT #1, and furthermore no mass re-registrations occurred because of the movement of the satellites #1 and #2.

The preceding discussion shows that as long as the UT 5 remains at a certain radius R from the GW 1, and the PFD is such that the UT is able to maintain communication with the GW, the user may continue to make calls independent of the movement of the satellite antenna patterns projected onto the surface of the earth.

A definition is now provided of a the zone around the GW 1 wherein the UT 5 may continuously achieve connection continuity with the GW 1. Computer simulations, or actual Radio Frequency signal strength measurements, may be used to define the zone. The process is straightforward. The GW 1 is placed at a particular latitude and longitude. The area surrounding the GW 1 is divided into a checkerboard of small squares. A desired Minimum PFD is selected. A link budget program with the satellite ephemeri included is run for each satellite antenna pattern of the constellation 4 projected onto the earth. The program records the maximum PFD at that instant in time in each square caused by the satellites 3 that are overhead at that instant. The constellation 4 is then advanced in time, for example by one minute, and the link budget calculation is repeated, and the maximum PFD recorded. This process is continued until the constellation ground track repeats itself. The maximum PFD in each square is thus recorded. A graphical representation of this process is shown in FIGS. 11E-11H. For illustrative purposes the satellites 3 are shown advancing in such a manner that the GW 1 accesses them sequentially and, in fact, the GW 1 is in constant contact with two or more satellites. Note should be made that using the presently preferred constellation, at the equator a small percentage of the time, there is only one satellite with its RF footprint such that the GW 1 can contact it. At a short time later a second satellite begins to contact the GW 1 while the GW 1 is still in contact with the first satellite.

In FIG. 1E, the "black" satellite is shown in contact with the GW 1. The instantaneous PFD in each square generated by the black satellite antenna pattern is shown as the numbers 1, 2, and 3 for illustrative purposes. These values are usually provided in terms of PFD per square meter per MHz, with values of approximately $-126$ dbW/m$^2$/MHz to $-113$ dbW/m$^2$/MHz. As shown, the "white" satellite has not yet begun contact with the GW 1.

Figure 11F:
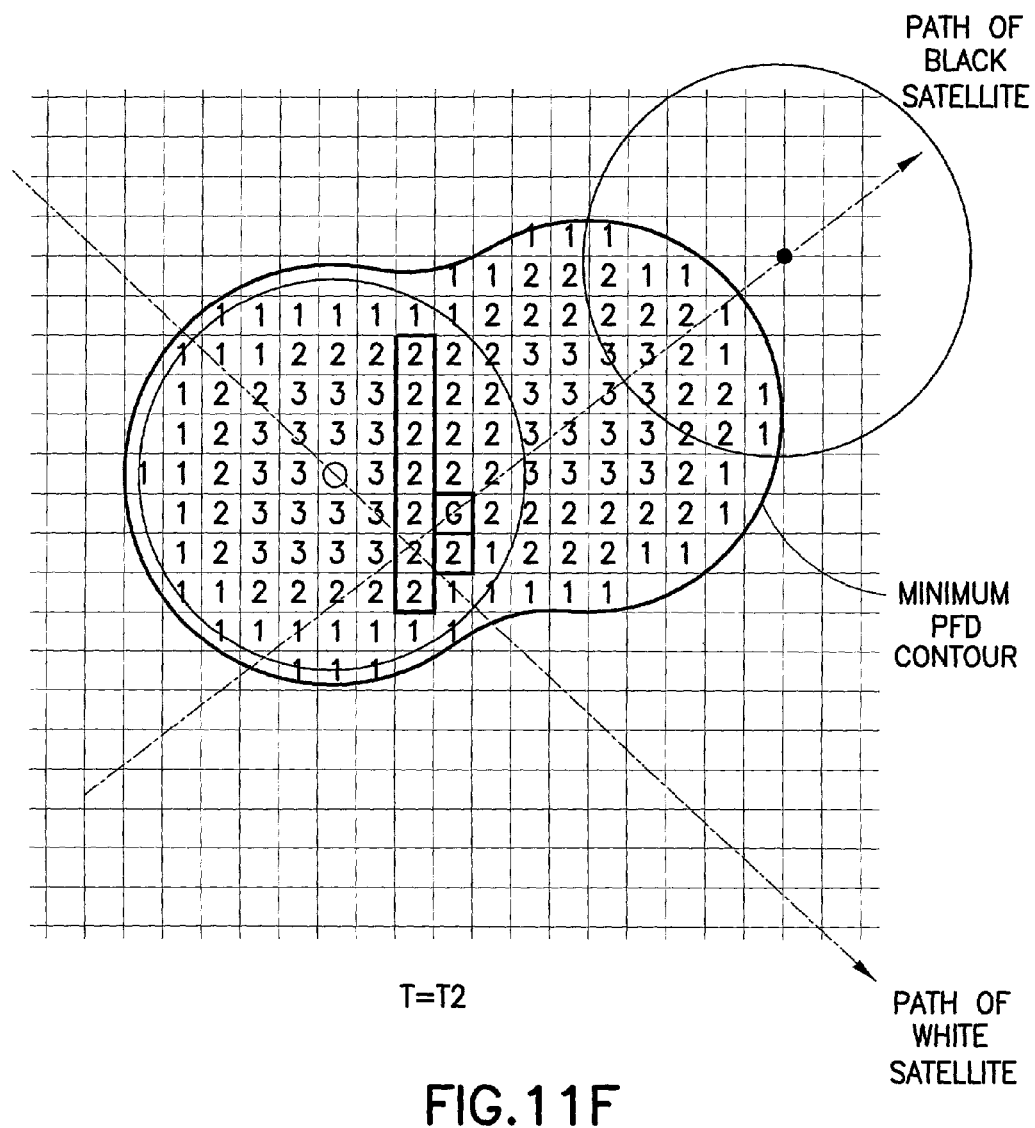
Figure 11G:
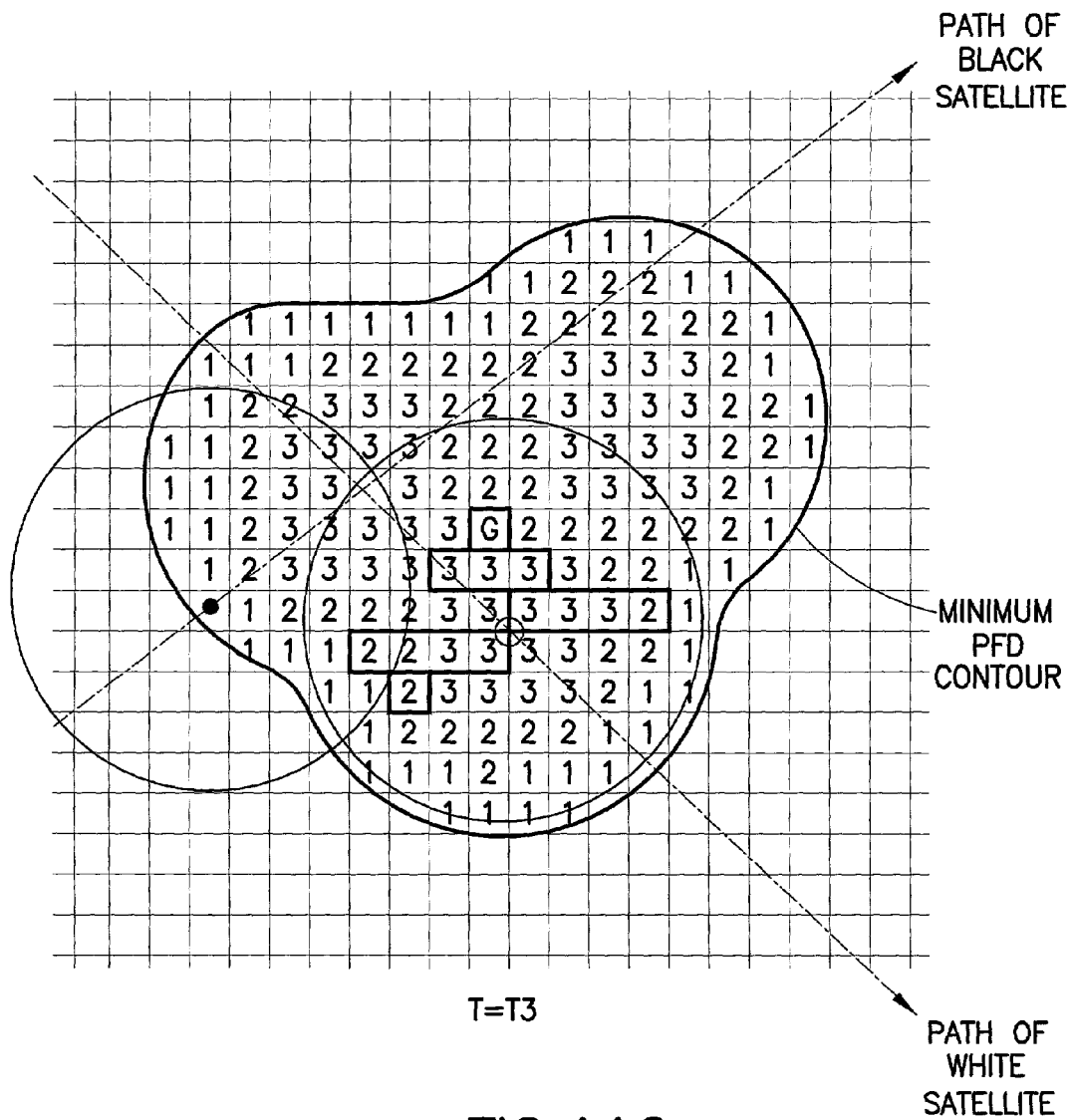
Figure 11H:
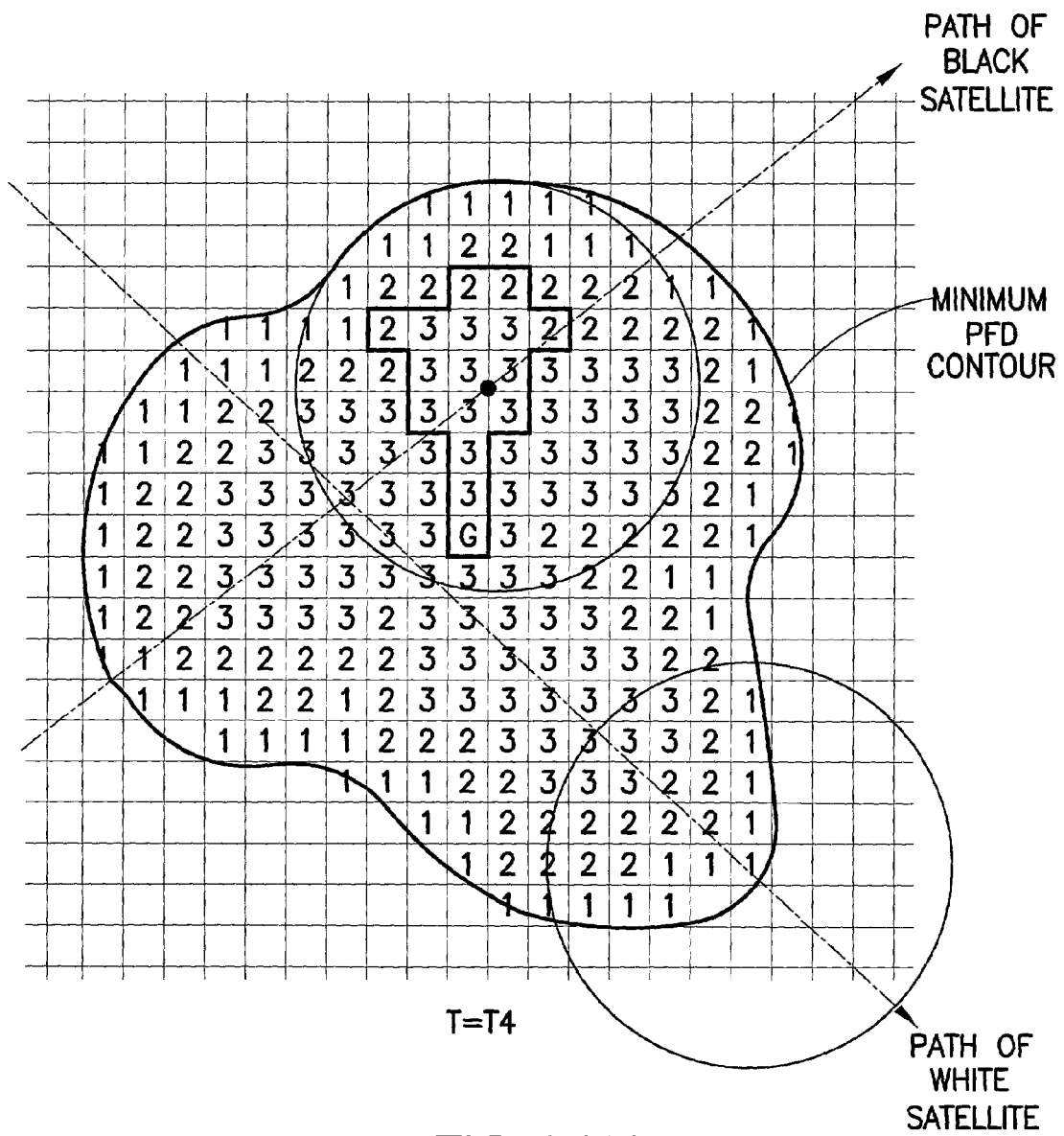
Figure 11I:
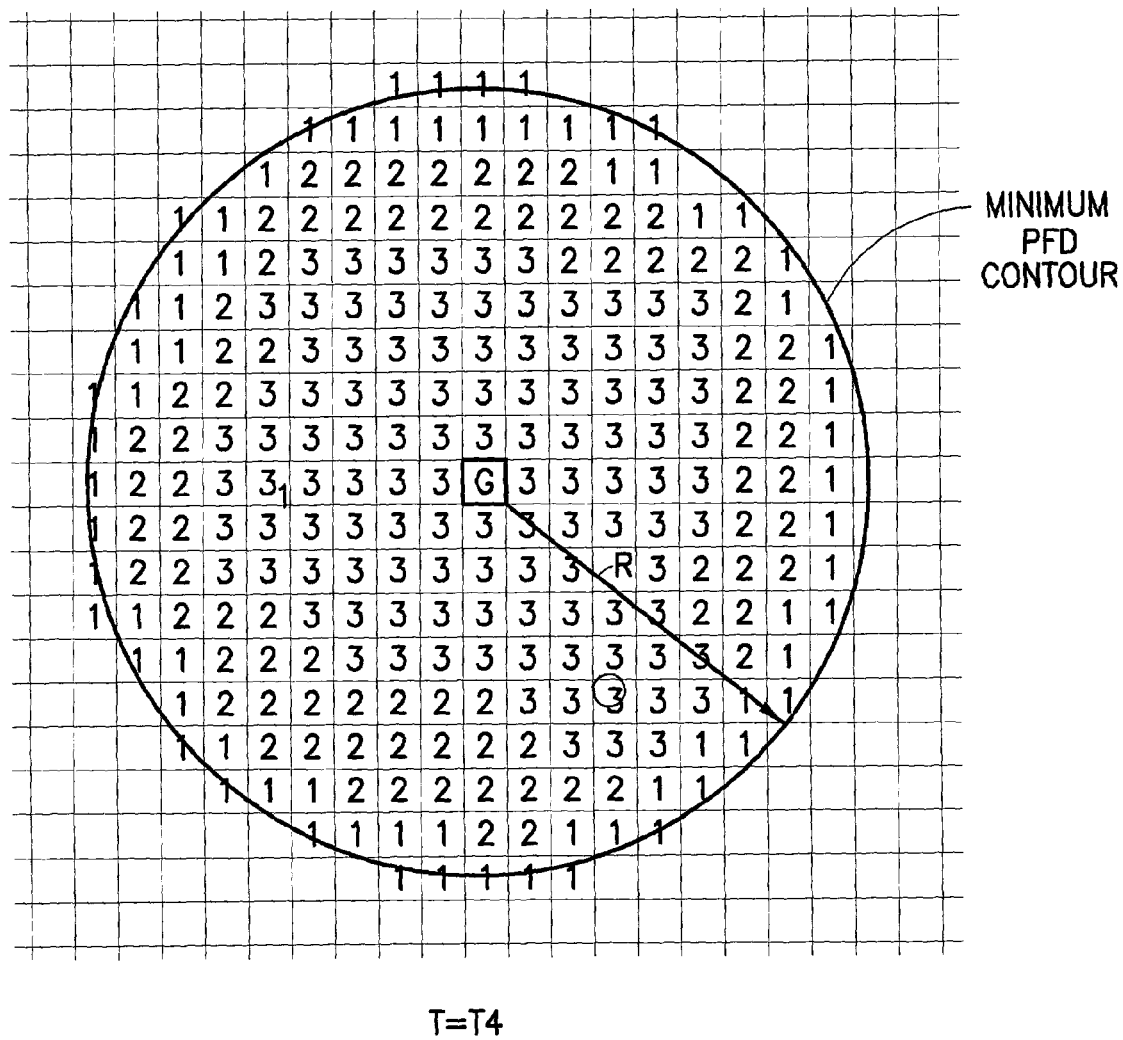

In FIG. 11F the black satellite no longer contacts the GW 1, and the white satellite has begun communications with it. At this time, for example 1 minute later than FIG. 11E, the values of the white satellite are recorded. If a particular square has a higher PFD it is recorded. In the diagram the dark outline squares have changed PFD. Notice a ring of squares with the value 1 is beginning to form about the GW 1. In FIG. 11G a second black satellite is approaching the operation point with the GW 1, but is not in contact yet, and the white satellite has moved on in its orbit. The PFD values are recorded 1 minute after the previous snapshot in FIG. 11F. Again, notice the changed PFD squares with a dark outline. In FIG. 11H the white satellite has lost contact with the GW 1 and the second black satellite is beginning its pass. The minimum PFD contour is taking a characteristic circular shape as shown in FIG. 11I.

By continuing this process eventually a shape emerges, dependent on the constellation parameters and the latitude of the GW 1, that has a minimum PFD that exists 100% of the time. Notice that a UT 5 is not required to develop the minimum PFD contour. As long as the UT 5 remains within this contour, access from the GW 1 or access messages to the GW 1 may be sent and received without re-registering the UT 5 with the GW 1.

In order to use these PFD contours, the calculated PFD contours are established as a series of points or nodes in a database in the GW 1 memory. The data is input to a computer program for use in accepting or rejecting UTs 5 from registering or operating in certain modes. The electronic map of the service area thus created is composed of the nodes, and connecting lines which may be preferably straight or curved according to a mathematical formula. Combinations of the contours may be at various PFD levels. The PFD levels thus created are not necessarily static. They may be either temporary or fixed, or may be varying with time. Since the GW 1 can be moving, the PFD level contours may be moving also. It is possible that the PFD contours can be changing in both magnitude and position at the same time.

While the invention has been particularly shown and described with respect to preferred embodiments thereof, it will be understood by those skilled in the art that changes in form and details may be made therein without departing from the scope and spirit of the invention.

What is claimed is:

1. A method for operating a mobile satellite communication system having at least one gateway (GW), at least one user terminal (UT), and a constellation of satellites, comprising steps of:
   allowing access to said constellation of communication satellites by specifying an exclusion zone having a confidence limit (CL) associated therewith; and
   selectively providing service to a UT depending on a determined location of the UT relative to the exclusion zone and on an estimated error (E) of the determined UT location,
   wherein location of the UT is determined by the UT, and transmitted to the GW, or wherein location of the UT is determined by the GW.

2. A method as in claim 1, wherein the exclusion zone is specified to comprise at least one of a polygon that defines an area, a volume, or a surface.

3. A method as in claim 1, wherein location of the UT is determined by the UT in cooperation with the GW.

4. A method as in claim 1, wherein the exclusion zone is specified to comprise at least one of a polygon that defines an area, a volume, or a surface, and further considers at least one of RF obstructions and terrain features.

5. A method as in claim 1, wherein the UT is granted service if the value of E is less than CL.

6. A method as in claim 1, wherein the exclusion zone is specified to comprise a polygon defined by connected points on the surface of the earth.

7. A method as in claim 1, wherein boundaries of the exclusion zone are static.

8. A method as in claim 1, wherein boundaries of the exclusion zone are dynamic and capable of at least one of movement or change in shape.

9. A method as in claim 1, wherein the value of E is a function of the accuracy of the UT local oscillator, and where information that specifies the accuracy of the UT local oscillator is stored in the UT.

10. A method as in claim 1, wherein the value of E is a function of the accuracy of the UT local oscillator, and where information that specifies the accuracy of the UT local oscillator is stored in the GW.

11. A method as in claim 1, wherein the value of E is a function of the accuracy of the UT local oscillator, and where information that specifies the accuracy of the UT local oscillator is stored in a home GW of the UT, and is transferred from the home GW to a serving GW when the UT is roaming.

12. A method as in claim 1, wherein the value of E is a function of the accuracy of the UT local oscillator, and where information that specifies the accuracy of the UT local oscillator is stored in or is determined by the UT and is transferred to the GW.

13. A method as in claim 1, wherein there are overlapping exclusion zones specified, each having a different value of CL.

14. A method as in claim 1, wherein the exclusion zone is temporary and is established and removed as a function of time.

15. A method as in claim 1, wherein the values of at least one of CL and E vary as a function of time.

16. A method as in claim 1, wherein at least one of the location or shape of the exclusion zone varies as a function of a change in location of the UT.

17. A method as in claim 1, wherein at least one of the location or shape of the exclusion zone varies as a function of a change in location of the GW.

18. A method as in claim 1, wherein at least one of the location or shape of the exclusion zone varies as a function of a change in location of the protected site.

19. A method as in claim 1, wherein the exclusion zone is shared between at least two gateways.

20. A method for operating a mobile satellite communication system having at least one gateway (GW), at least one user terminal (UT), and a constellation of satellites, comprising steps of:
   allowing access to said constellation of communication satellites by specifying an exclusion zone having a confidence limit (CL) associated therewith; and
   selectively providing service to a UT depending on a determined location of the UT relative to the exclusion zone and on an estimated error (E) of the determined UT location, wherein the exclusion zone is specified to comprise at least one of a volume defined by connected points on the surface of the earth and at least one point located above the surface of the earth or a surface defined by at least two connected points on the surface of the earth and at least one point located above the surface of the earth.

21. A method for operating a mobile satellite communication system having at least one gateway (GW), at least one user terminal (UT), and a constellation of satellites, comprising steps of:
   allowing access to said constellation of communication satellites by specifying an exclusion zone having a confidence limit (CL) associated therewith; and
   selectively providing service to a UT depending on a determined location of the UT relative to the exclusion zone and on an estimated error (E) of the determined UT location, wherein the UT is granted service if the value of E is less than CL, and where the GW sets the value of CL to be one of less than a possible minimum value of E for excluding all UTs from operating within the exclusion zone or greater than a possible maximum value of E for enabling all UTs to operate within the exclusion zone.

22. A mobile satellite communication system comprising at least one gateway (GW), at least one user terminal (UT), and a constellation of satellites, said GW comprising a controller for controlling operations of said UT and further comprising an interface to at least one of the Public Switched Telephone Network (PSTN) or to the Internet, said GW storing a database containing at least one of a Confidence Polygon, a Confidence Volume, or a Confidence Surface to establish a geometric shape located on the earth, above the earth or in space, or combinations thereof, said GW further storing a static or a variable Confidence Limit (CL) value that is compared to a value of an error (E) in a position location of the UT, said controller acting upon the database and assigned or derived values of CL and E, to determine if a comparison of CL and E, combined with a current position of the UT, yields a certain result according to the operational mode of the GW controller, wherein depending on the operational mode of the GW the result of the comparison affects control of the UT or an external device attached to the UT, whereby the UT is forbidden or allowed to access the mobile satellite system or to make or receive a call, or depending on the operational mode of the GW the result of the comparison affects some operational characteristic of the UT to provide an ability to protect a site from UT emissions.

* * * * *